(12) United States Patent
Olli et al.

(10) Patent No.: US 9,809,270 B2
(45) Date of Patent: Nov. 7, 2017

(54) SIX-WHEEL ALL-TERRAIN VEHICLE

(71) Applicant: BOMBARDIER RECREATIONAL PRODUCTS INC., Valcourt (CA)

(72) Inventors: Jukka Olli, Hirvas (FI); Paavo Sieppi, Kivitaipale (FI); Hannu Yleva, Rovaniemi (FI); Heikki Makkonen, Rovaniemi (FI); Antti Suhanko, Rovaniemi (FI); Jari Jokelainen, Rovaniemi (FI)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/899,815

(22) PCT Filed: Jun. 28, 2014

(86) PCT No.: PCT/US2014/044763
§ 371 (c)(1),
(2) Date: Dec. 18, 2015

(87) PCT Pub. No.: WO2014/210580
PCT Pub. Date: Dec. 31, 2014

(65) Prior Publication Data
US 2016/0144922 A1 May 26, 2016

Related U.S. Application Data

(60) Provisional application No. 61/841,040, filed on Jun. 28, 2013.

(51) Int. Cl.
*B62K 5/01* (2013.01)
*B62J 1/00* (2006.01)
*B62D 61/10* (2006.01)

(52) U.S. Cl.
CPC ............... *B62K 5/01* (2013.01); *B62D 61/10* (2013.01); *B62J 1/00* (2013.01)

(58) Field of Classification Search
CPC ............... B62K 5/01; B62J 1/00; B62D 61/10
(Continued)

(56) References Cited

U.S. PATENT DOCUMENTS 6,695,566 B2    2/2004   Rodriguez Navio
8,328,271 B2 *  12/2012  Gagnon ................... B60P 1/26
                                                      296/183.1

(Continued)

OTHER PUBLICATIONS

International Search Report of PCT/US2014/044763; received from ISA/US; Shane Thomas; Oct. 28, 2014.
(Continued)

*Primary Examiner* — Joseph D Pape
*Assistant Examiner* — Dana Ivey
(74) *Attorney, Agent, or Firm* — BCF LLP

(57) ABSTRACT

A vehicle has a frame, a motor connected to the frame, two front wheels operatively connected to the frame, two intermediate wheels operatively connected to the frame, the two intermediate wheels being disposed rearward of the two front wheels, two rear wheels operatively connected to the frame, the two rear wheels being disposed rearward of the intermediate wheels, a driver seat connected to the frame, a passenger seat disposed at least in part rearward of the driver seat, the driver seat and the passenger seat being straddle seats, and a cargo box connected to the frame, the passenger seat being disposed at least in part forward of the cargo box.

21 Claims, 31 Drawing Sheets

(58) Field of Classification Search
USPC .................................................. 296/203.01
See application file for complete search history.

(56) References Cited

U.S. PATENT DOCUMENTS

| | | | | |
|---|---|---|---|---|
| 2003/0047576 A1* | 3/2003 | Babbitt | ...................... | B62J 9/00 |
| | | | | 224/401 |
| 2003/0062203 A1 | 4/2003 | Hurlburt | | |
| 2003/0102694 A1* | 6/2003 | Rondeau | ................ | B62D 33/02 |
| | | | | 296/203.04 |
| 2007/0051553 A1* | 3/2007 | Yasuda | ................... | B62K 5/01 |
| | | | | 180/376 |
| 2007/0273135 A1* | 11/2007 | Labadens | ................. | B60R 9/06 |
| | | | | 280/769 |

OTHER PUBLICATIONS

2008 Polaris Sportsman 6X6 (A08CL50AA) Body, Decals; retrieved from http://www.polarispartspitstop.com/oemparts/a/pol/50354b85f870023684111ac5/body-decals on Feb. 24, 2017.
Bombardier Recreational Products Inc.; Bombardier ATV Brochure; 2005; Canada.

* cited by examiner

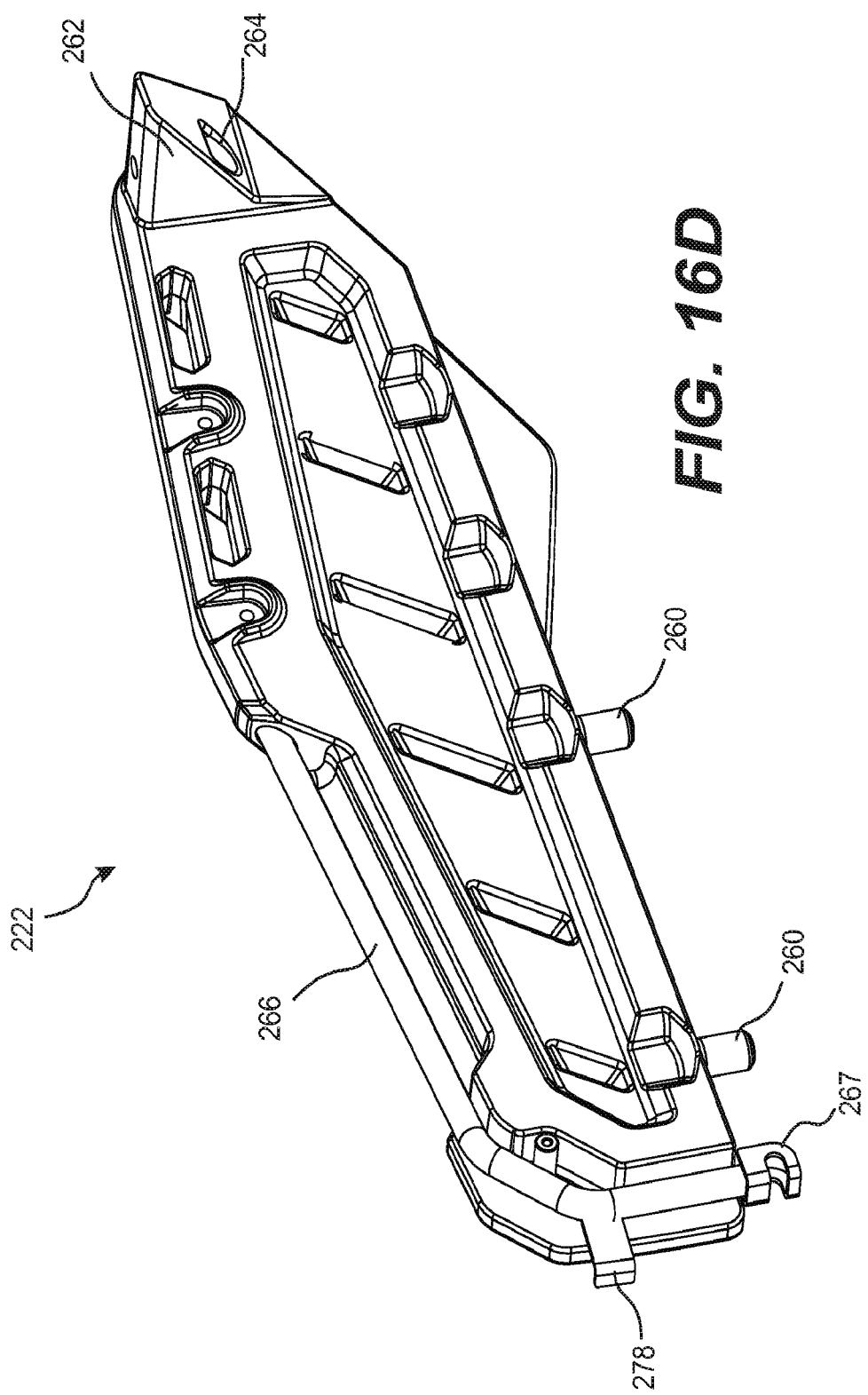

SIX-WHEEL ALL-TERRAIN VEHICLE

CROSS-REFERENCE

The present application claims priority to U.S. Provisional Patent Application No. 61/841,040, filed Jun. 28, 2013, the entirety of which is incorporated herein by reference.

FIELD OF TECHNOLOGY

The present technology relates to six-wheel all-terrain vehicles.

BACKGROUND

All-terrain vehicles commonly have four wheels and a straddle seat adapted to accommodate a driver of the vehicle. To transport cargo, these vehicles are provided with one or more racks to which the cargo can be attached.

Although the above arrangement is suitable for most recreational uses and some utilitarian uses, for some all-terrain vehicles it does not provide sufficient cargo capacity. Also, for some utilitarian uses, it could be practical for the vehicle to provide room for a passenger.

There is therefore a need for an all-terrain vehicle providing additional cargo space and room for a passenger.

SUMMARY

It is an object of the present technology to ameliorate at least some of the inconveniences present in the prior art.

According to one aspect of the present technology, there is provided a vehicle having a frame, a motor connected to the frame, two front wheels operatively connected to the frame, two intermediate wheels operatively connected to the frame, the two intermediate wheels being disposed rearward of the two front wheels, two rear wheels operatively connected to the frame, the two rear wheels being disposed rearward of the intermediate wheels, a driver seat connected to the frame, a passenger seat disposed at least in part rearward of the driver seat, the driver seat and the passenger seat being straddle seats, and a cargo box connected to the frame, the passenger seat being disposed at least in part forward of the cargo box.

In some implementations of the present technology, the driver and passenger seats are both laterally centered about a longitudinal centerline of the vehicle.

In some implementations of the present technology, a majority of the passenger seat is disposed rearward of the driver seat.

In some implementations of the present technology, a front portion of the passenger seat overlaps the rear portion of the driver seat.

In some implementations of the present technology, the passenger seat has a seat bottom and a seat back.

In some implementations of the present technology, the seat bottom of the passenger seat is vertically higher than the driver seat.

In some implementations of the present technology, two swing arms connect the intermediate wheels to the frame. The swing arms pivot about a swing arm axis. The intermediate wheels rotate about intermediate wheel axes. At least a majority of the seat bottom is disposed longitudinally between the intermediate wheel axes and the swing arm axis.

In some implementations of the present technology, at least one grab handle is provided on at least one side of the passenger seat.

In some implementations of the present technology, the passenger seat is completely rearward of the motor.

In some implementations of the present technology, the intermediate wheels rotate about intermediate wheel axes. At least a majority of the passenger seat is disposed forward of the intermediate wheel axes.

In some implementations of the present technology, a portion of the cargo box extends forward of a rear portion of the passenger seat.

In some implementations of the present technology, the cargo box is pivotally connected to the frame about a pivot axis. The passenger seat is disposed completely forward of the pivot axis.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 16D is a perspective view taken from a rear, right side of a left side wall of the cargo box;

DETAILED DESCRIPTION

Figure 1:
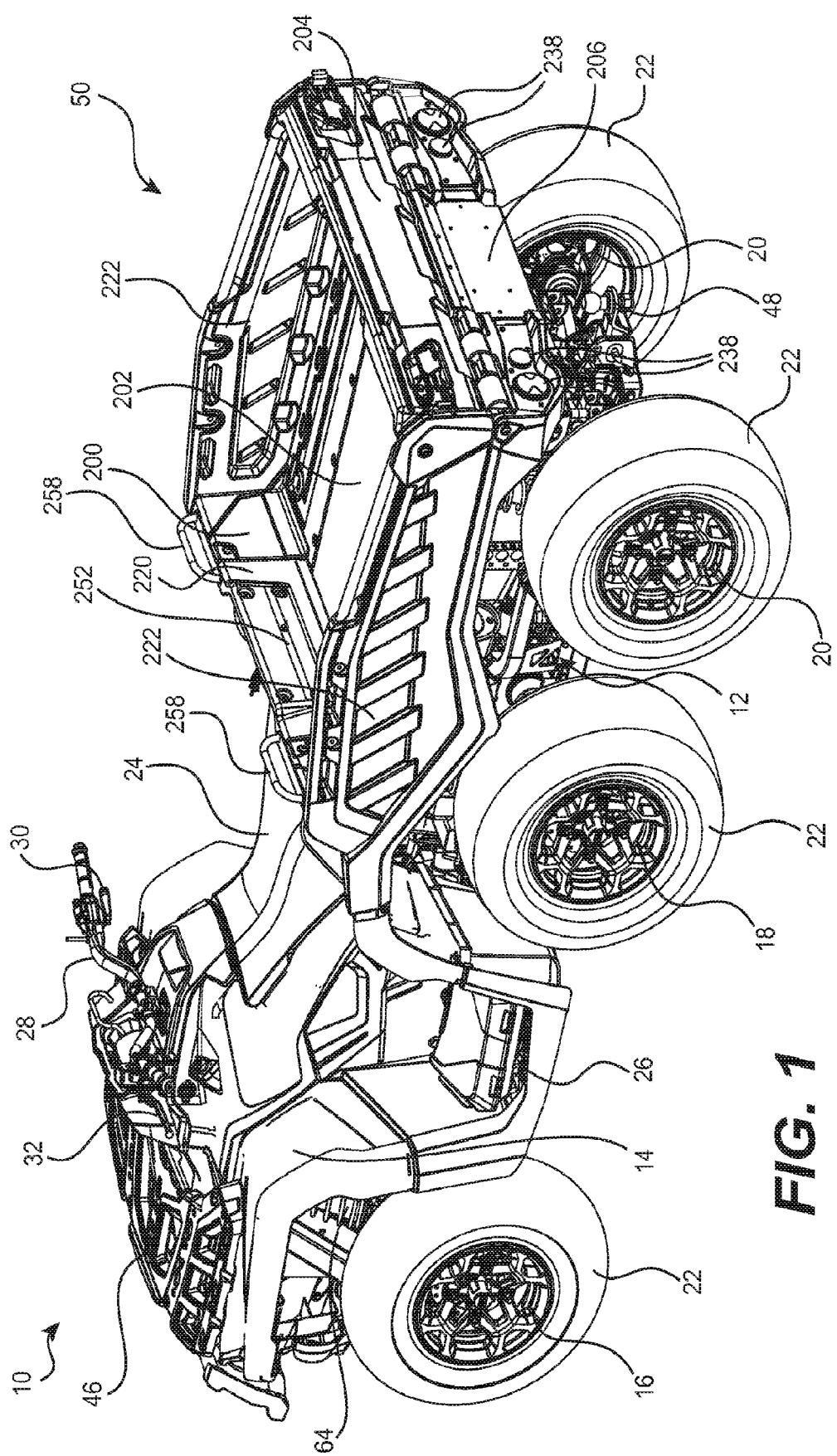
FIG. 1 is a perspective view taken from a rear left side of a six-wheel all-terrain vehicle (ATV)
Figure 2:
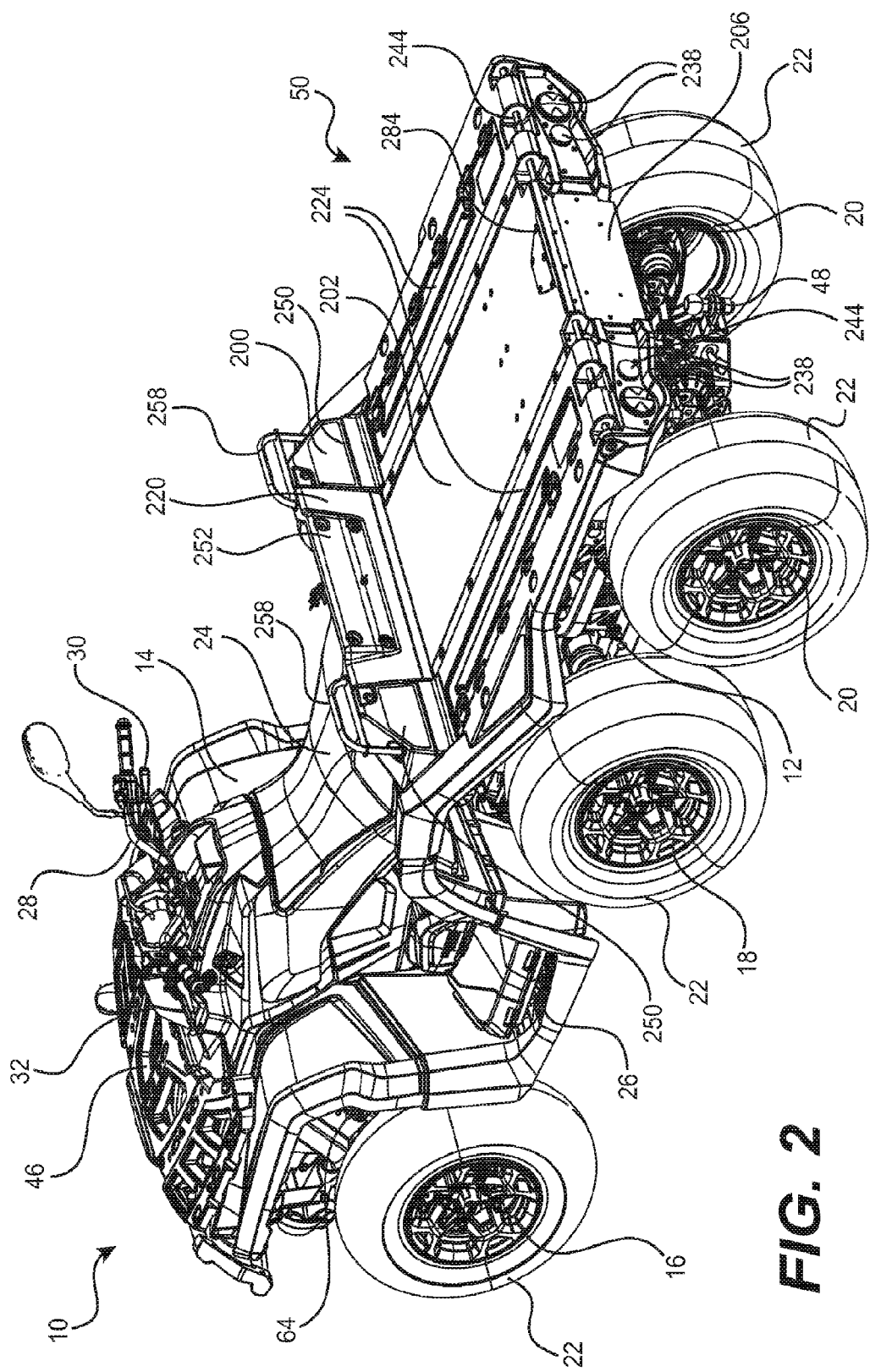
FIG. 2 is a perspective view of the ATV of FIG. 1 with side walls and an upper tailgate of a cargo box removed.
Figure 3:
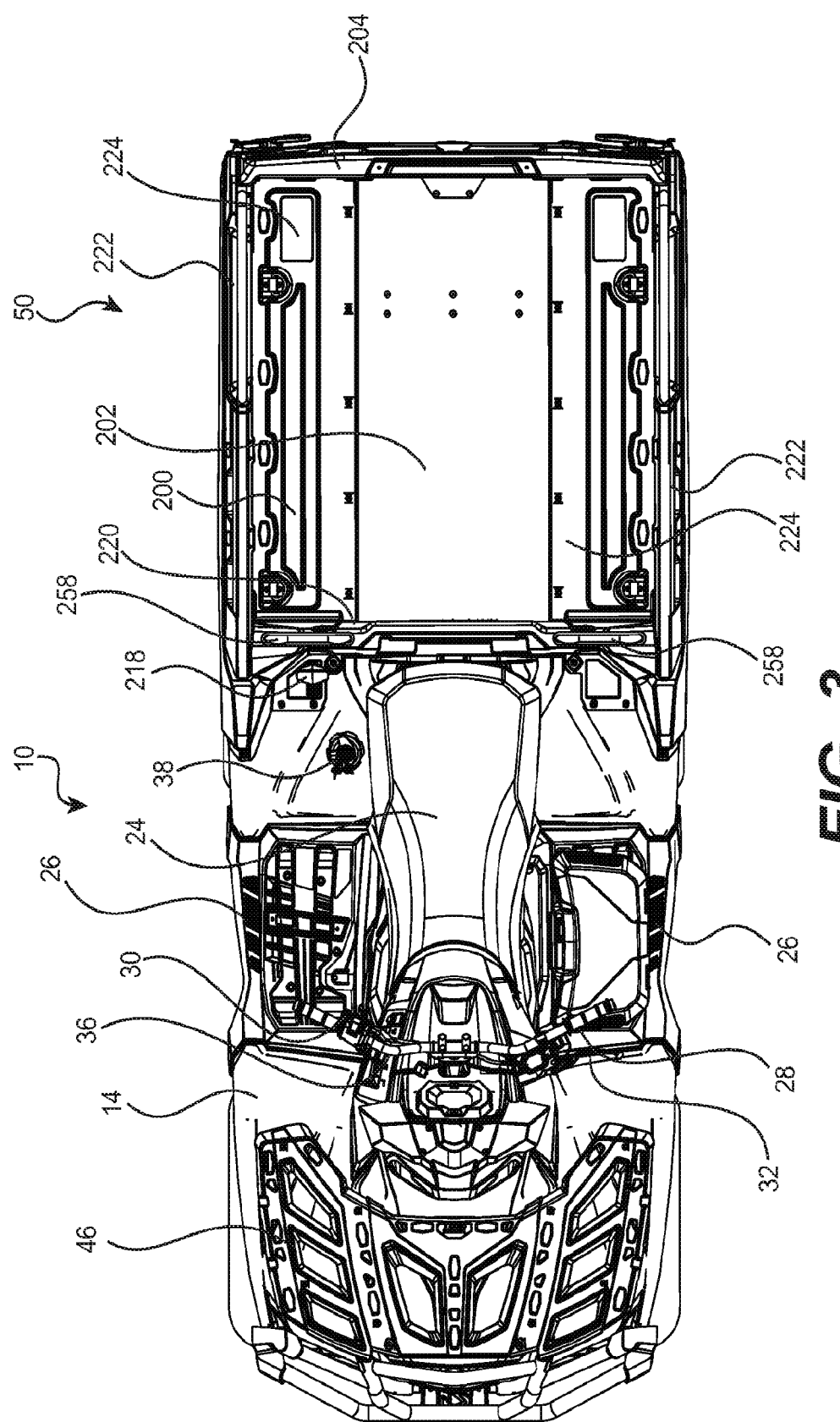
FIG. 3 is a top plan view of the ATV of FIG. 1.
Figure 4:
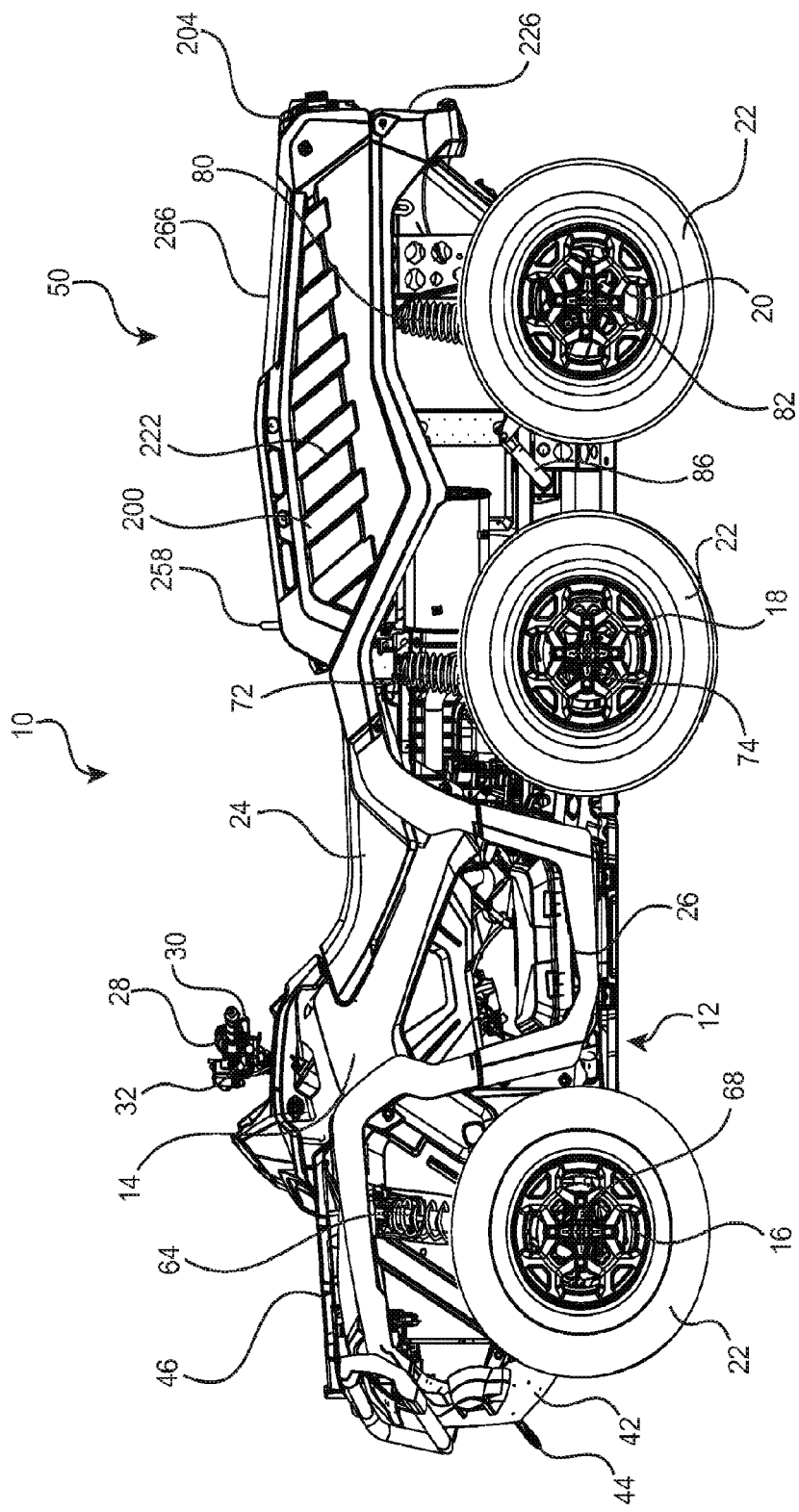
FIG. 4 is a left side elevation view of the ATV of FIG. 1.
Figure 5:
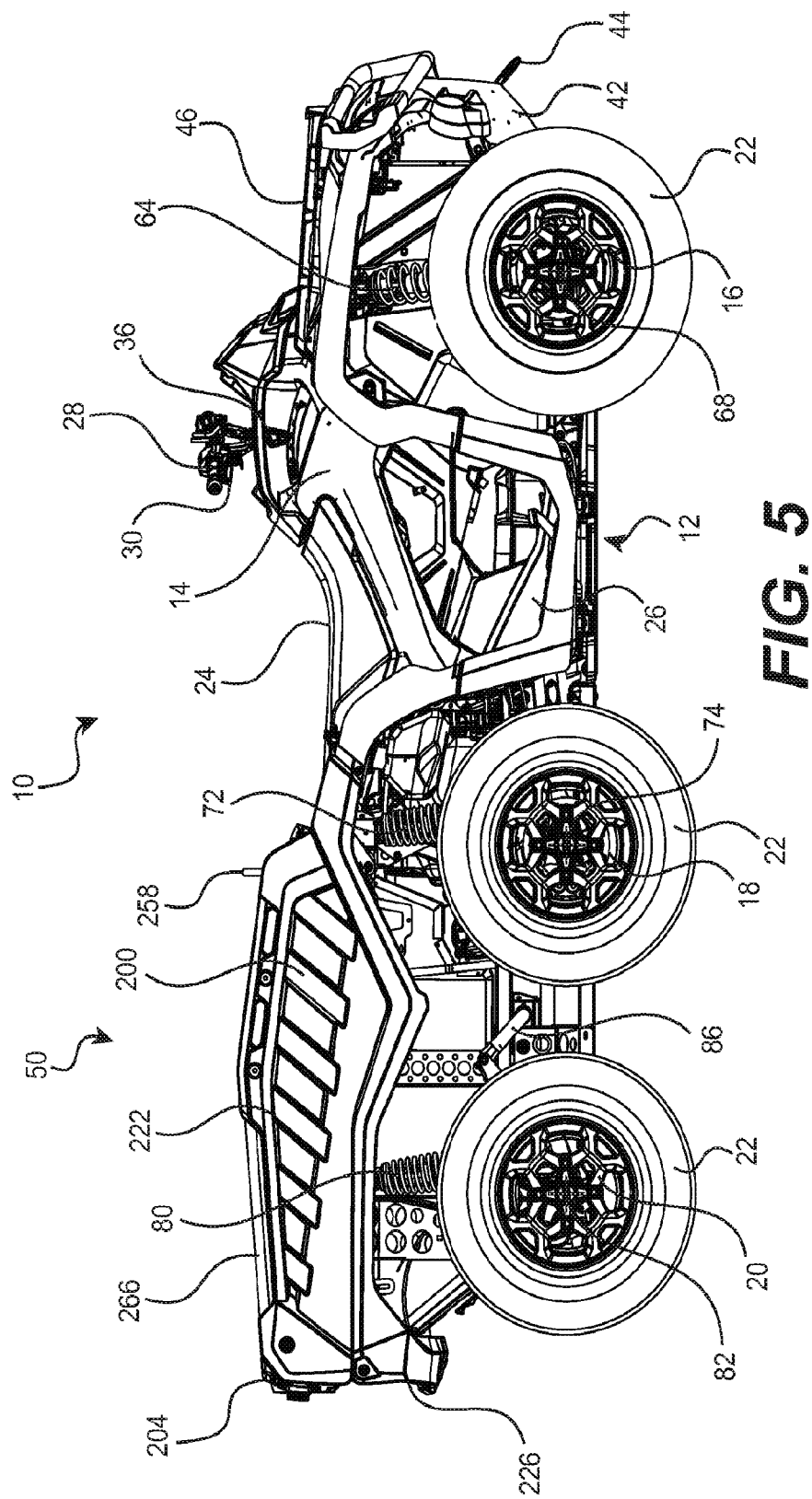
FIG. 5 is a right side elevation view of the ATV of FIG. 1.

FIGS. 1 to 6 illustrate a six-wheel ATV 10. The ATV 10 has a frame 12 to which a vehicle body 14 is mounted. Two front wheels 16 are suspended from a front of the frame 12. Two intermediate wheels 18 are suspended from the frame 12 rearward of the front wheels 16. Two rear wheels 20 are suspended from the frame 12 rearward of the intermediate wheels 18. As can be seen, the longitudinal distance between the intermediate and rear wheels 18, 20 is less than the longitudinal distance between the front and intermediate wheels 16, 20. Each of the six wheels 16, 18, 20 has a tire 22. A straddle seat 24 is mounted on the frame 12 to accommodate a driver of the ATV 10. As can be seen a portion of the seat 24 is disposed between the front wheels 16 and the intermediate wheels 18 in a longitudinal direction of the ATV 10. Foot rests 26 are provided on either side of seat 24 below the seat 24. As can be seen, each foot rest 26 is disposed longitudinally between the front wheel 16 and the intermediate wheel 18 on the side on which it is located.

A steering assembly including a handlebar 28 is disposed forwardly of the straddle seat 24. A throttle lever 30 and a brake lever 32 are mounted to the handlebar 28. The steering assembly is operatively connected to the two front wheels 16 to permit steering of the ATV 10. A motor 34 (FIG. 8) is mounted to the frame 12 below the straddle seat 22. In the present implementation, the motor 34 is a four-stroke, dual cylinder, V-type, internal combustion engine (ICE). It is contemplated that the motor 34 could be another type of motor such as, but not limited to, a two-stroke ICE, a diesel engine, or an electric motor. The motor 34 is operatively connected to the six wheels 16, 18, 20 to power the ATV 10 as will be described below. A gear selection lever 36 is provided below the handlebar 28 forward of the seat 24. A fuel filler cap 38 (FIG. 3) is provided on the vehicle body 14 to a right of a rear portion of the seat 24.

A front winch assembly is provided near a front of the ATV 10. The front winch assembly includes a winch motor (not shown) mounted to the frame 12 forwardly of the motor 34, a cable (not shown) connected to the winch motor and passing through an opening 40 (FIG. 6) in a front plate 42 connected to the frame 12, and a hook 44 connected to the end of the cable. A cargo rack 46 is mounted to the vehicle body 14 forward of the handlebar 28. A hitch ball 48 is connected to the rear of the frame 12. The hitch ball 48 can be removed from the frame 12.

A cargo box 50 is pivotally mounted to the frame 12 rearward of the straddle seat 24 as will be described below.

The ATV 10 has other features and components common to most ATVs such as headlights, a fuel tank, an air intake system and an exhaust system. As it is believed that these features and components would be readily recognized by one of ordinary skill in the art, further explanation and description of these components will not be provided herein. Other features of the ATV 10 will be described below.

Figure 7:
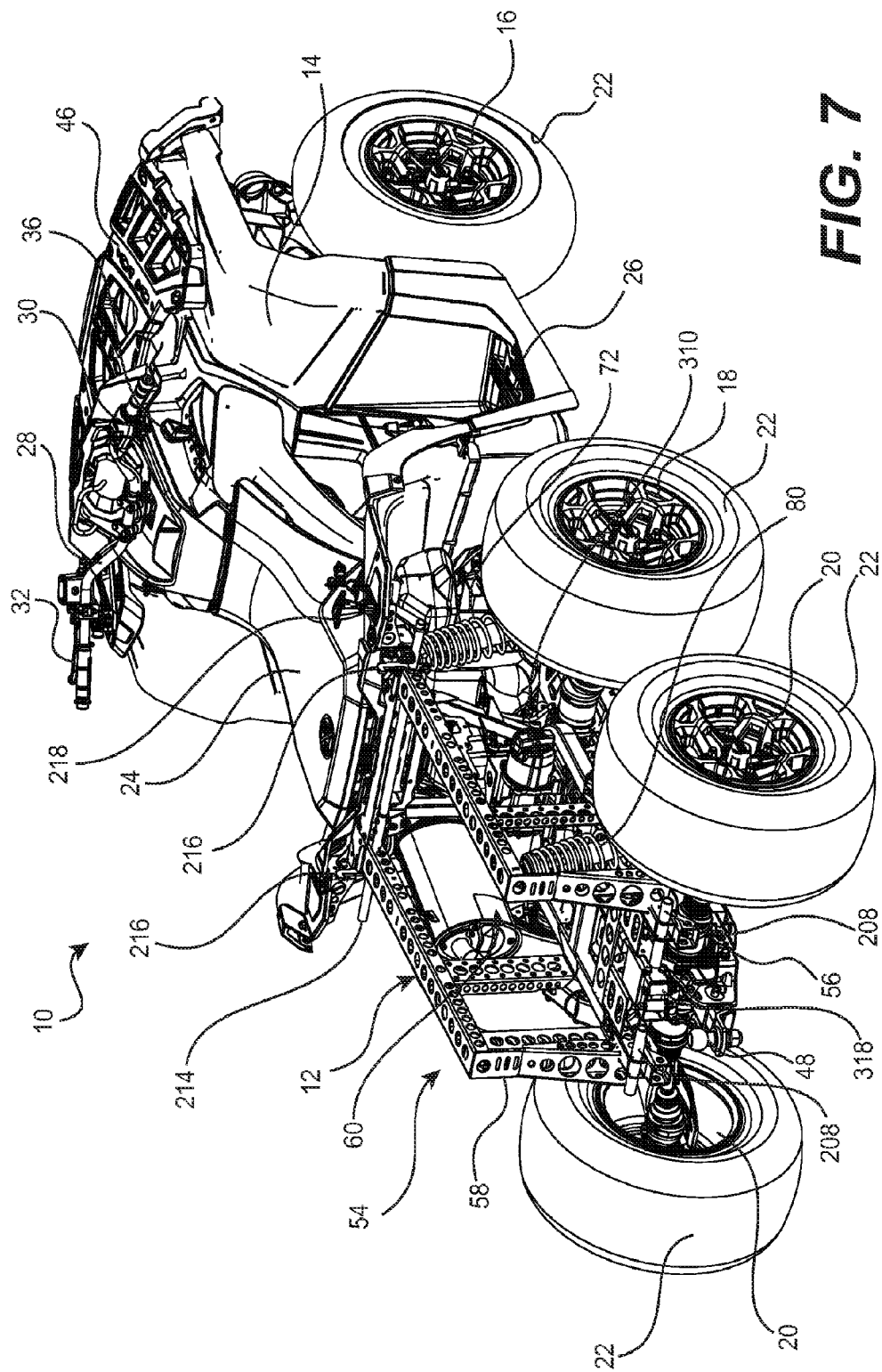
FIG. 7 is a perspective view taken from a rear, right side of the ATV of FIG. 1 with the cargo box removed.
Figure 8:
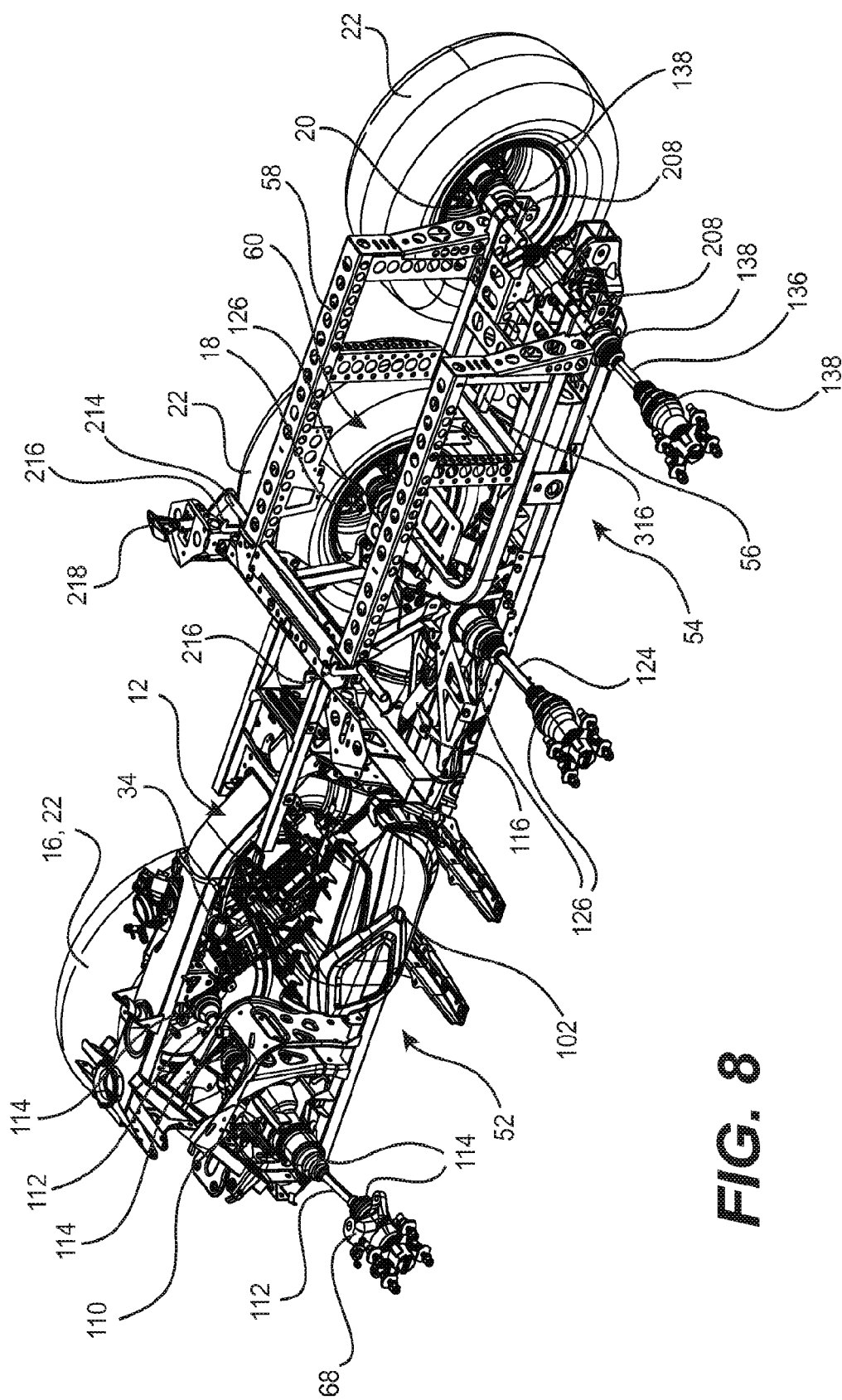
FIG. 8 is a perspective view taken from a rear, right side of a frame, a drive assembly, an engine, and right wheels of the ATV of FIG. 1.

Turning now to FIGS. 7 and 8, the frame 12 will be described in more details. The frame 12 has a front frame portion 52 and a rear frame portion 54 that are fastened to each other. The front frame portion 52 is similar to the frames shown and described in U.S. Pat. No. 6,799,781, issued Oct. 5, 2004, and U.S. Pat. No. 8,434,774, issued May 7, 2013, both of which are incorporated herein by reference. The front and intermediate wheels 16, 18 are connected to the front frame portion 52. The rear frame portion 54 has lower longitudinally extending frame members 56 to which the rear wheels 20 are connected. The fronts of the frame members 56 are connected to the front frame portion 52. The rear frame portion 54 also has a cargo box supporting frame 58. The cargo box supporting frame 58 is connected on top of the frame members 56 and is connected at its front to the front frame portion 52. The cargo box supporting frame 58 defines a space 60 to receive the cargo box 50 therein.

Figure 6:
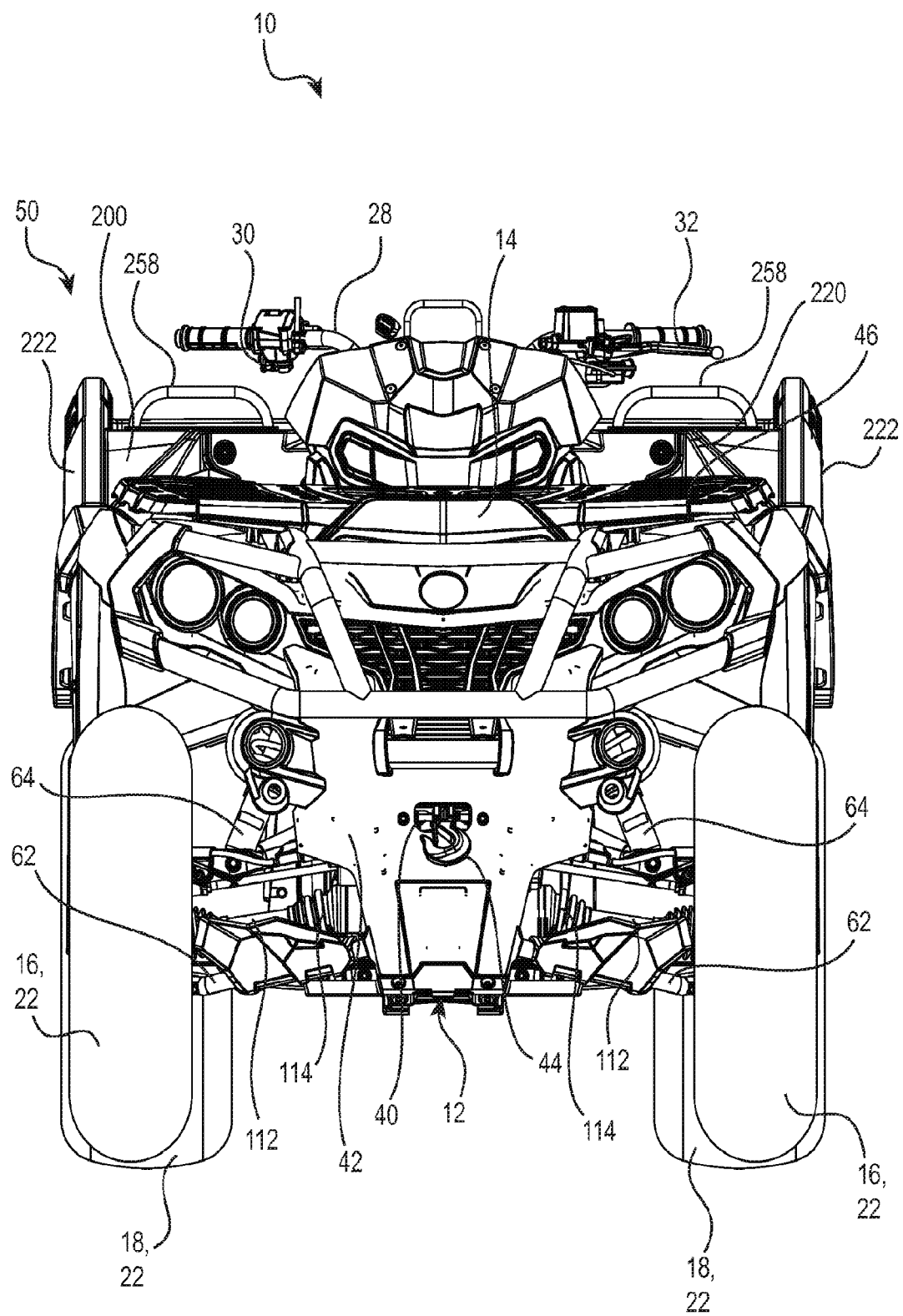
FIG. 6 is a front elevation view of the ATV of FIG. 1.
Figure 9:
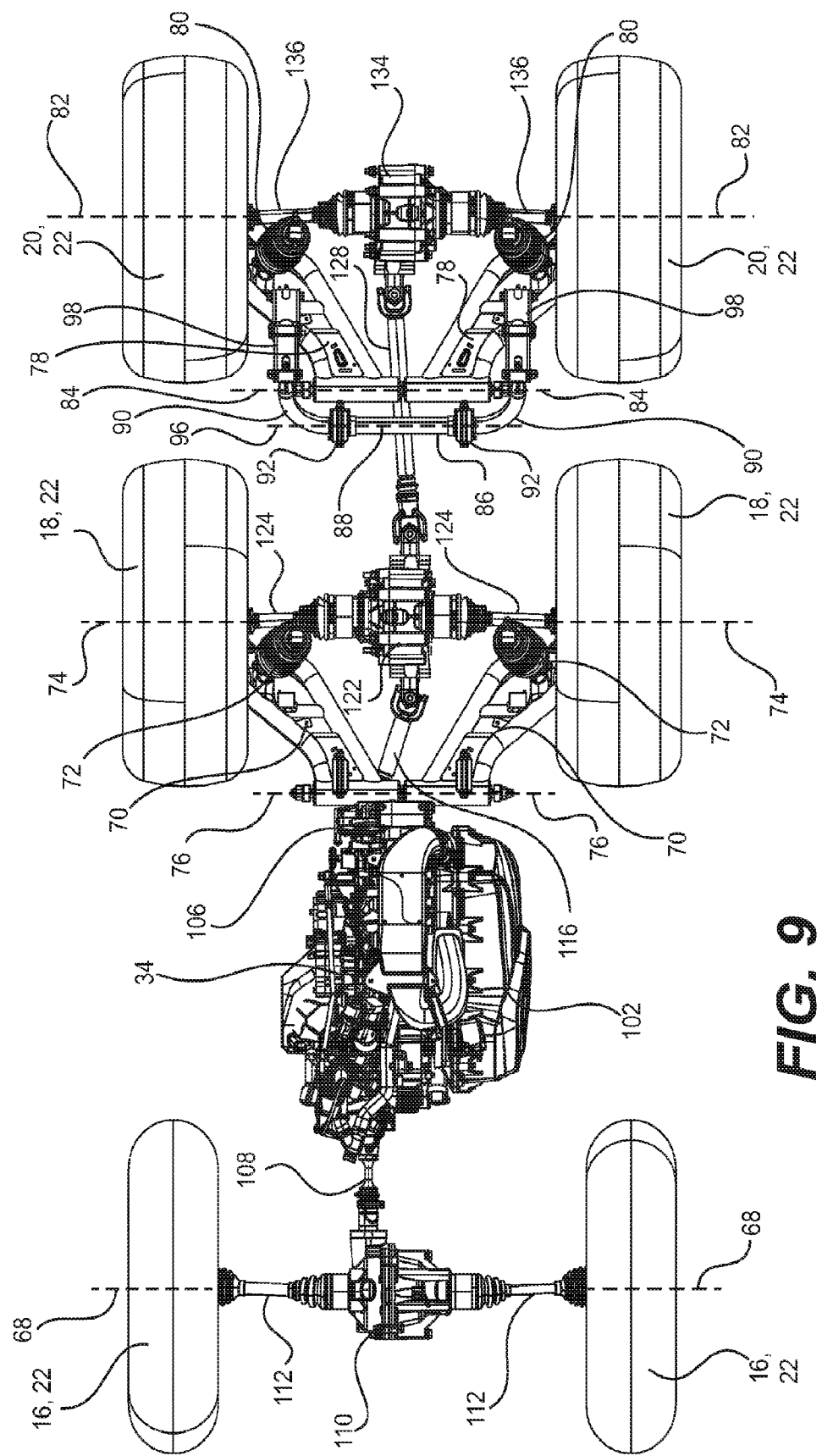
FIG. 9 is a top plan view of the engine, the drive assembly, the wheels, an intermediate suspension and a rear suspension of the ATV of FIG. 1.
Figure 10:
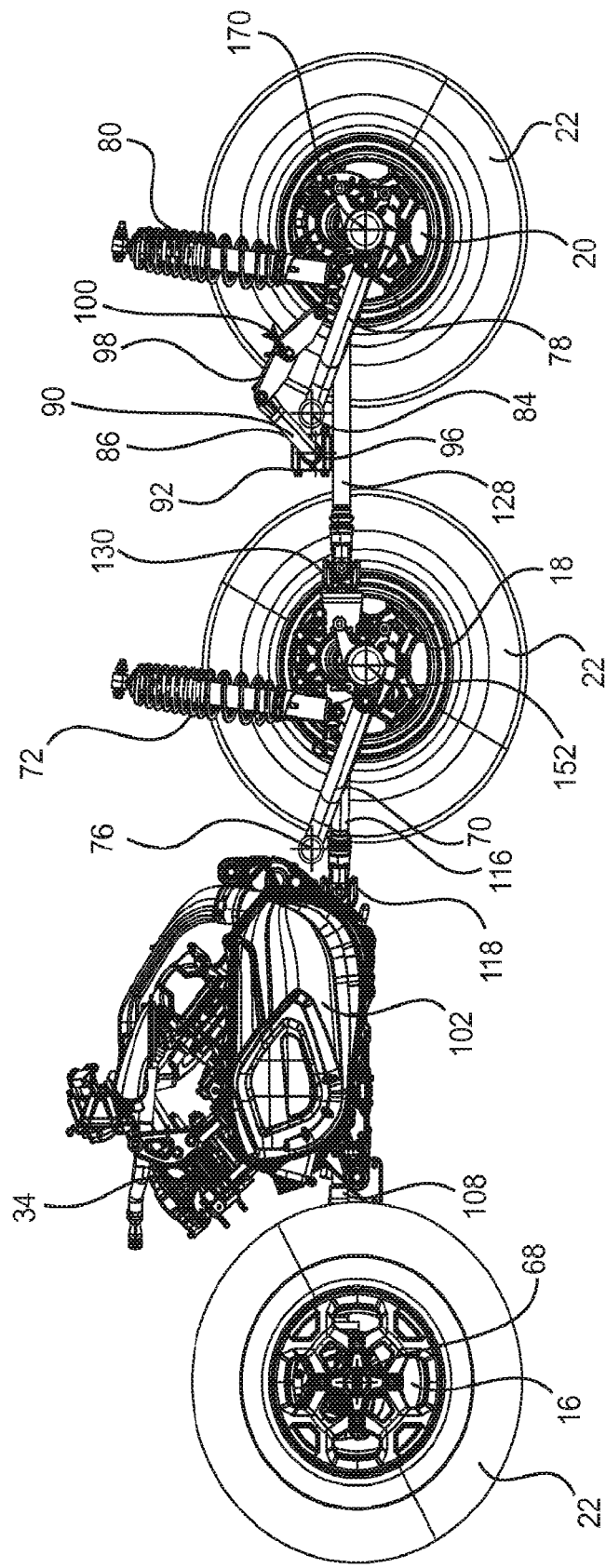
FIG. 10 is a left side elevation view of the elements of FIG. 9 with the left intermediate and rear wheels removed.

Turning now to FIGS. 6, 9 and 10, the suspension system of the ATV 10 will be described in more detail. As best seen in FIG. 6, each front wheel 16 is connected to the frame 12 by a suspension including a lower control arm 62 and a shock absorber and spring assembly 64. The lower control arm 62 is pivotally connected at one end to the frame 12 about a generally longitudinal axis. The other end of the lower control arm 62 is connected via a ball joint (not shown) to a kingpin 66 (FIG. 8). The kingpin 66 receives the front wheel shaft (not shown) of the front wheel 16 therein. One or more bearings (not shown) rotationally support the front wheel shaft inside the kingpin 66 thereby allowing the front wheel 16 to turn about a front wheel axis 68. The shock absorber and spring assembly 64 is connected at its upper end to the frame 12 and at its lower end to the kingpin 66.

It is contemplated that the front wheels 16 could be connected to the frame 12 by another type of suspension such as, but not limited to, a swing arm suspension or a double A-arm suspension.

As best seen in FIGS. 9 and 10, each intermediate wheel 18 is connected to the frame by a swing arm suspension including a swing arm 70 and a shock absorber and spring assembly 72. It is contemplated that the swing arm 70 could be replaced by another type of suspension arm such as, but not limited to, one or two A-arms. The swing arm 70 defines a sleeve (not shown) at a rear end thereof that receives the intermediate wheel shaft (not shown) therein. One or more bearings (not shown) rotationally support the intermediate wheel shaft inside the sleeve thereby allowing the intermediate wheel 18 to turn about an intermediate wheel axis 74. The front end of the swing arm 70 is pivotally connected to the frame 12 about a laterally extending swing arm axis 76, thereby allowing the intermediate wheel 18 to move up and down about the swing arm axis 76. The swing arm axis 76 is disposed between the front wheel axis 68 and the intermediate wheel axis 74 in the longitudinal direction of the ATV 10. The shock absorber and spring assembly 72 is connected at its lower end to the swing arm 70 and at its upper end to the frame 12.

Each rear wheel 20 is connected to the frame by a swing arm suspension including a swing arm 78 and a shock absorber and spring assembly 80. It is contemplated that the swing arm 78 could be replaced by another type of suspension arm such as, but not limited to, one or two A-arms. The swing arm 78 defines a sleeve (not shown) at a rear end thereof that receives the rear wheel shaft (not shown) therein. One or more bearings (not shown) rotationally support the rear wheel shaft inside the sleeve thereby allowing the rear wheel 20 to turn about a rear wheel axis 82. The front end of the swing arm 78 is pivotally connected to the frame 12 about a laterally extending swing arm axis 84, thereby allowing the rear wheel 20 to move up and down about the swing arm axis 84. The swing arm axis 84 is disposed between the intermediate wheel axis 74 and the rear wheel axis 82 in the longitudinal direction of the ATV 10. The shock absorber and spring assembly 80 is connected at its lower end to the swing arm 78 and at its upper end to the frame 12.

A sway bar 86 has a generally straight central portion 88 (FIG. 9) and two rearwardly and upwardly extending end portions 90. The central portion 88 is pivotally supported inside two bushing blocks 92. The bushing blocks 92 are connected to the frame 12. As such, the sway bar 86 can pivot inside the bushing blocks 92 about a laterally extending sway bar axis 96. The sway bar axis 96 is disposed between the intermediate wheel axis 74 and the swing arm axis 84 in the longitudinal direction of the ATV 10. Hinges 98 pivotally connects the ends of the sway bar 86 to their corresponding swing arms 78. The hinges 98 are disposed between the sway bar axis 96 and the rear wheel axes 82 in a longitudinal direction of the ATV 10. Each hinge 98 has a hinge lock 100 (FIG. 10) selectively rigidly connecting the two portions of the hinge 98 to each other to prevent them from pivoting relative to each other.

When the hinge locks 100 of both hinges 98 are locked, movement of one of the rear wheels 20 relative to the other one of the rear wheels 20 causes torsion of the sway bar 86 which then causes relative vertical movement of the other one of the rear wheels 20. When the hinge locks 100 of both hinges 98 are unlocked, the two portions of the hinges 98 can pivot relative to each other. As a result, when one of the rear wheels 20 moves vertically relative to the frame 12, the corresponding end of the sway bar 86 does not move and there is no torsion of the sway bar 86 and the swing arm 78 and shock absorber and spring assembly 80 on the opposite side of the frame 12 are unaffected by the vertical movement of the rear wheel 20. It is contemplated that for large vertical movement of one of the rear wheels 20 relative to the frame 12, the pivotal limit the two portions 98 of the hinge could be reached, thereby resulting in some torsion of the sway bar 86 and the transfer of movement to the swing arm 78 and shock absorber and spring assembly 80 on the opposite side of the frame 12. International Patent Publication No. WO/2013/165901, published Nov. 7, 2013, the entirety of which is incorporated herein by reference, describes a similar sway bar, hinges and hinge locks arrangement.

Figure 11:
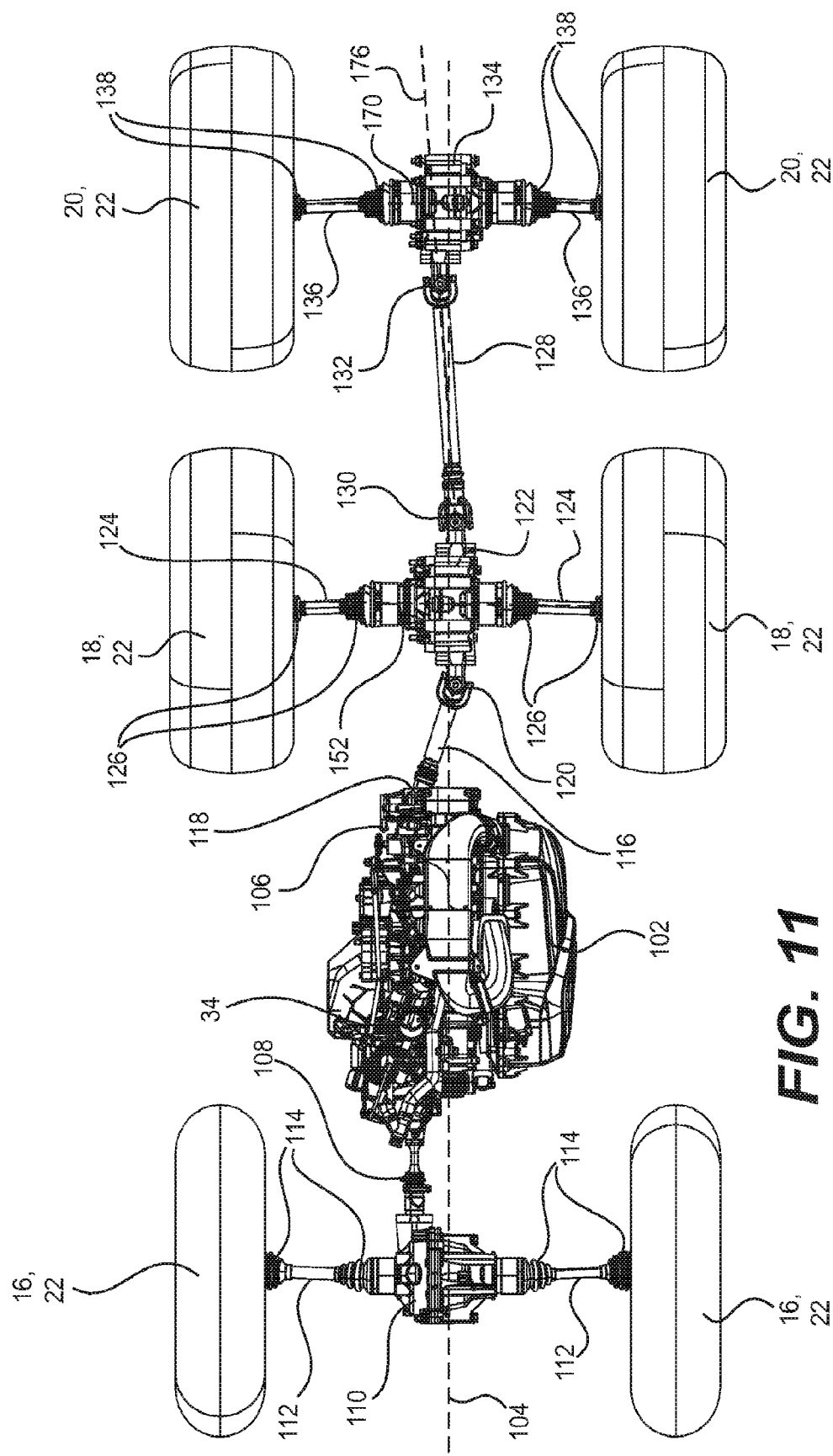
FIG. 11 is a top plan view of the engine, the drive assembly and the wheels of the ATV of FIG. 1.
Figure 12:
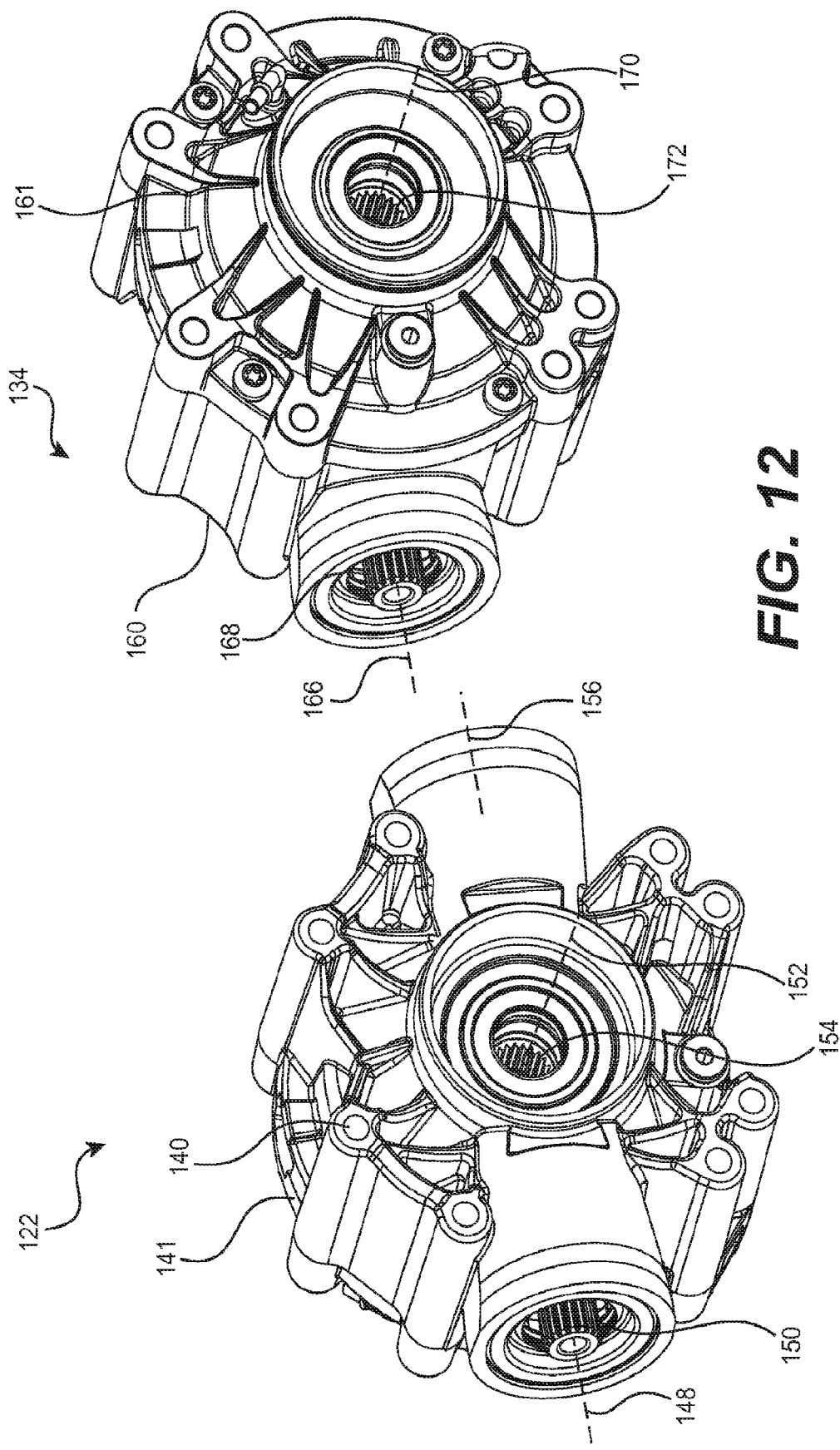
FIG. 12 is a perspective view taken from a front, left side of an intermediate gear assembly and a rear gear assembly of the drive assembly of FIG. 11.
Figure 13:
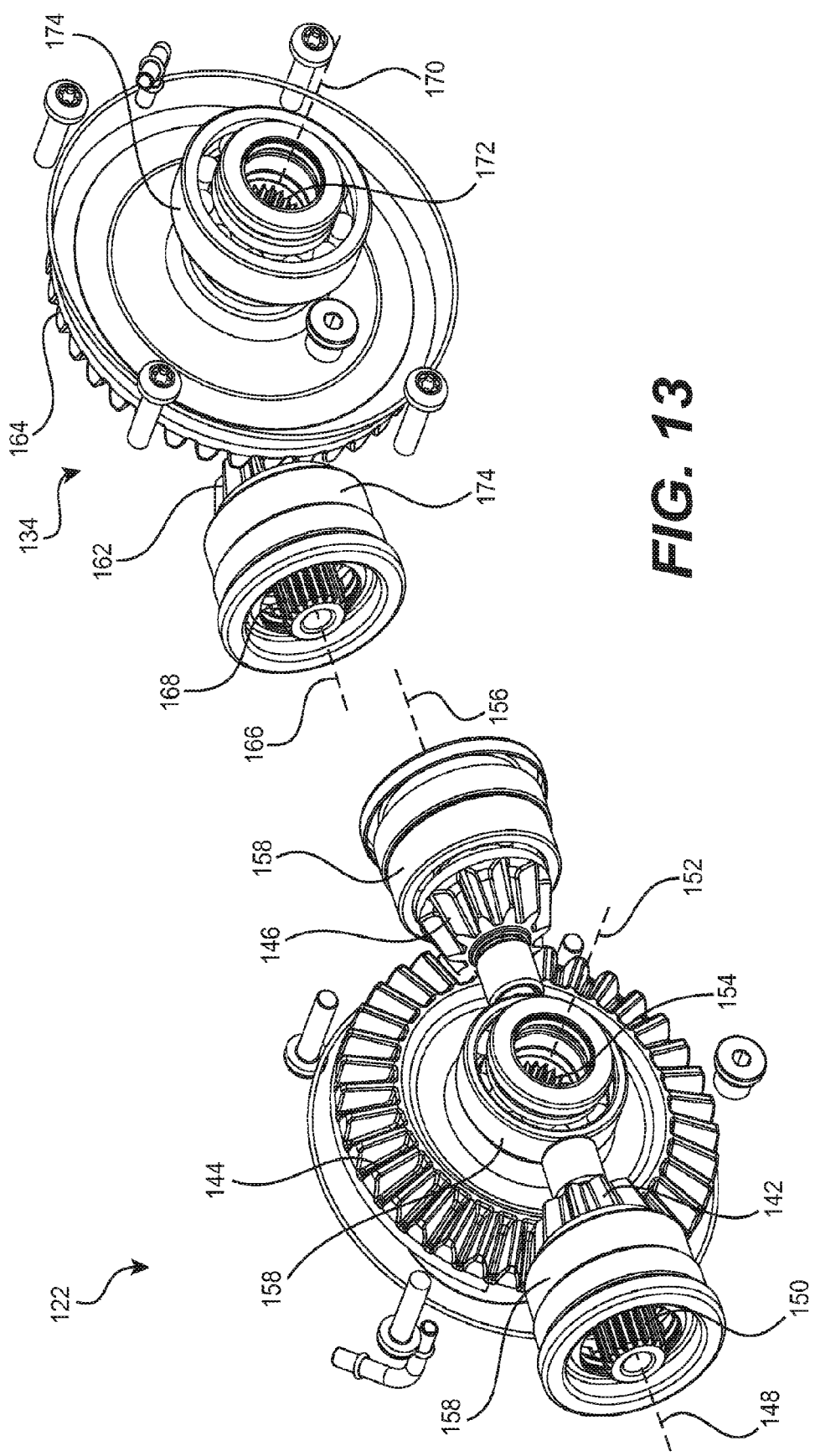
FIG. 13 is a perspective view taken from a front, left side of the intermediate gear assembly and the rear gear assembly of FIG. 12 with the housings of the gear assemblies removed to show internal components thereof.

Turning now to FIGS. 11 to 13, the drive assembly of the ATV 10 will be described in more detail. The output shaft (not shown) of the engine 34 is connected to a driving pulley (not shown) of a continuously variable transmission (CVT) 102. The CVT 102 also has a driven pulley (not shown) that is driven by the driving pulley via a drive belt (not shown). As can be seen in FIG. 11, the CVT 102 is disposed on a left side of a longitudinal centerline 104 of the ATV 10. The driven pulley drives a transmission 106 that is connected to the engine 34.

A driveshaft 108 is operatively connected at its rear end to the transmission 106 and at its front end to a gear assembly 110. As can be seen in FIG. 11, the driveshaft 108 is disposed on a right side of the centerline 104. The gear assembly 110 includes a driving bevel gear (not shown) connected to the front end of the driveshaft 108 and a driven bevel gear (not shown) disposed perpendicularly to the driving bevel gear and meshing therewith. Front drive axles 112 are connected at one end to the driving bevel gear via universal joints (not shown). The front drive axles 112 are connected at the other end to the front wheels 16 via universal joints (not shown). Rubber boots 114 cover the universal joints.

A driveshaft 116 is operatively connected at its front end via a universal joint 118 to the transmission 106 on a right side of the centerline 104. From its front end, the driveshaft 116 extends rearward and left and is operatively connected at its rear end via a universal joint 120 to a gear assembly 122. The gear assembly 122 will be described in greater detail below. Intermediate drive axles 124 are connected at one end to the gear assembly 122 via universal joints (not shown). The intermediate drive axles 124 are connected at the other end to the intermediate wheels 18 via universal joints (not shown). Rubber boots 126 cover the universal joints.

A driveshaft 128 is operatively connected at its front end via a universal joint 130 to the gear assembly 122. From its front end, the driveshaft 128 extends rearward and right and is operatively connected at its rear end via a universal joint 132 to a gear assembly 134. As can be seen in FIG. 11, the driveshaft 128 is eccentric and skewed relative to the driveshaft 116. The gear assembly 134 will be described in greater detail below. Rear drive axles 136 are connected at one end to the gear assembly 134 via universal joints (not shown). The rear drive axles 136 are connected at the other end to the rear wheels 20 via universal joints (not shown). Rubber boots 138 cover the universal joints.

With reference with FIGS. 12 and 13, the gear assemblies 122, 134 will be described in more detail. The gear assembly 122 has a two-part housing 140 inside which are disposed a bevel gear 142, a bevel gear 144 and a bevel gear 146. The housing 140 includes a cover 141. The bevel gear 144 has a larger diameter than the bevel gears 142, 146. The bevel gear 144 is disposed to the right of the bevel gears 142, 146 and meshes with the bevel gears 142, 146. The bevel gear 142 rotates about a gear axis 148 and is connected to the universal joint 120 via splines 150. The bevel gear 144 rotates about a gear axis 152 that is perpendicular to the gear axis 148 and is connected to the universal joints of the intermediate drive axles 124 via splines 154. The bevel gear 146 rotates about a gear axis 156 that is coaxial with the gear axis 148 and is connected to the universal joint 130 via splines (not shown). As can be seen the bevel gears 142, 146 are disposed on opposite sides of the gear axis 152. The bevel gears 142, 144, 146 are supported for rotation in the housing 140 by ball bearings 158.

The gear assembly 134 has a two-part housing 160 inside which are disposed a bevel gear 162 and a bevel gear 164. The housing 160 includes a cover 161 that is identical to the cover 141. The bevel gear 164 has a larger diameter than the bevel gear 162. The bevel gear 164 is disposed to the left of the bevel gear 162 and meshes with the bevel gear 162. The bevel gear 162 rotates about a gear axis 166 and is connected to the universal joint 132 via splines 168. The gear axis 166 is parallel to the gear axes 148, 156. The bevel gear 164 rotates about a gear axis 170 that is perpendicular to the gear axis 166 and is connected to the universal joints of the rear drive axles 136 via splines 172. The bevel gears 162, 164 are supported for rotation in the housing 160 by ball bearings 174. As can be seen, the portion of the gear assembly 134 forward of the gear axis 170 is a mirror image of the portion of the gear assembly 122 forward of the gear axis 152.

It is contemplated that the gear assembly 134 could also be provided with another bevel gear that rotates about a gear axis that is coaxial with the gear axis 166 and meshes with the bevel gear 164. This bevel gear would be provided with a connector, such as splines, that rotates therewith to permit a vehicle accessory to be connected thereto and be driven by the engine 34 via the drive assembly. In such an implementation, the gear assembly 134 would be the same as the gear assembly 122, but mounted to the frame such that the bevel gear 164 is on a left side of the bevel gear 162.

The bevel gears 144, 164 are arranged such that they are disposed on opposite sides of a vertical plane 176 (FIG. 11) containing the axis of rotation of the driveshaft 128. The bevel gears 142, 144, 146, 162 and 164 are arranged such that the driveshaft 116, the universal joints 118, 120 and the bevel gear 142 rotate in a direction opposite to a direction of rotation of the driveshaft 128, the universal joints 130, 132 and the bevel gears 146, 162 and such that the bevel gears 144, 164 rotate in the same direction.

In the present implementation, the bevel gears 142, 146 and 162 are identical and the bevel gears 144, 164 are identical.

Turning now to FIGS. 14 to 25, the cargo box 50 will be described in more detail. The cargo box 50 has a cargo box body 200, a removable cover 202, an upper tailgate 204 and a lower tailgate 206. The cargo box body 200 is pivotally connected to the cargo box supporting frame 58 via shafts 208 (best seen in FIG. 7). The shafts 208 define a pivot axis 210 of the cargo box 50. As can seen in FIG. 26, the pivot axis 210 of the cargo box 50 is disposed rearward of the rear wheel axes 82. A damper 212 (FIG. 25), which in the present implementation is an air shock, is connected between the cargo box body 200 and the frame 12 to dampen the pivoting motion of the cargo box 50 about the pivot axis 210. The cargo box 50 is locked in the position shown in the figures by a locking mechanism best seen in FIGS. 7, 8 and 18. The locking mechanism includes a shaft 214 rotationally connected to the frame 12, a pair of hooks 216 connected to the shaft 214 and a lever 218 connected to the shaft 214. The lever 218 is disposed in front of the cargo box 50 and to the right of a rear portion of the seat 24 (see FIG. 3). The hooks 216 are received in recesses (not shown) in the front of the cargo box body 200. To unlock the cargo box 50 a user pulls on the lever 218 which causes the shaft 214 and the hooks 216 to pivot (counter-clockwise with reference to FIG. 18) thereby disengaging the hooks 216 from the recesses and thereby permitting the cargo box 50 to pivot about the pivot axis 210. The shaft 214, hooks 216 and the lever 218 are biased toward the locked position. As such, when the cargo box 50 is pivoted back to the position shown in the figures, it will automatically be locked in place.

Figure 16A:
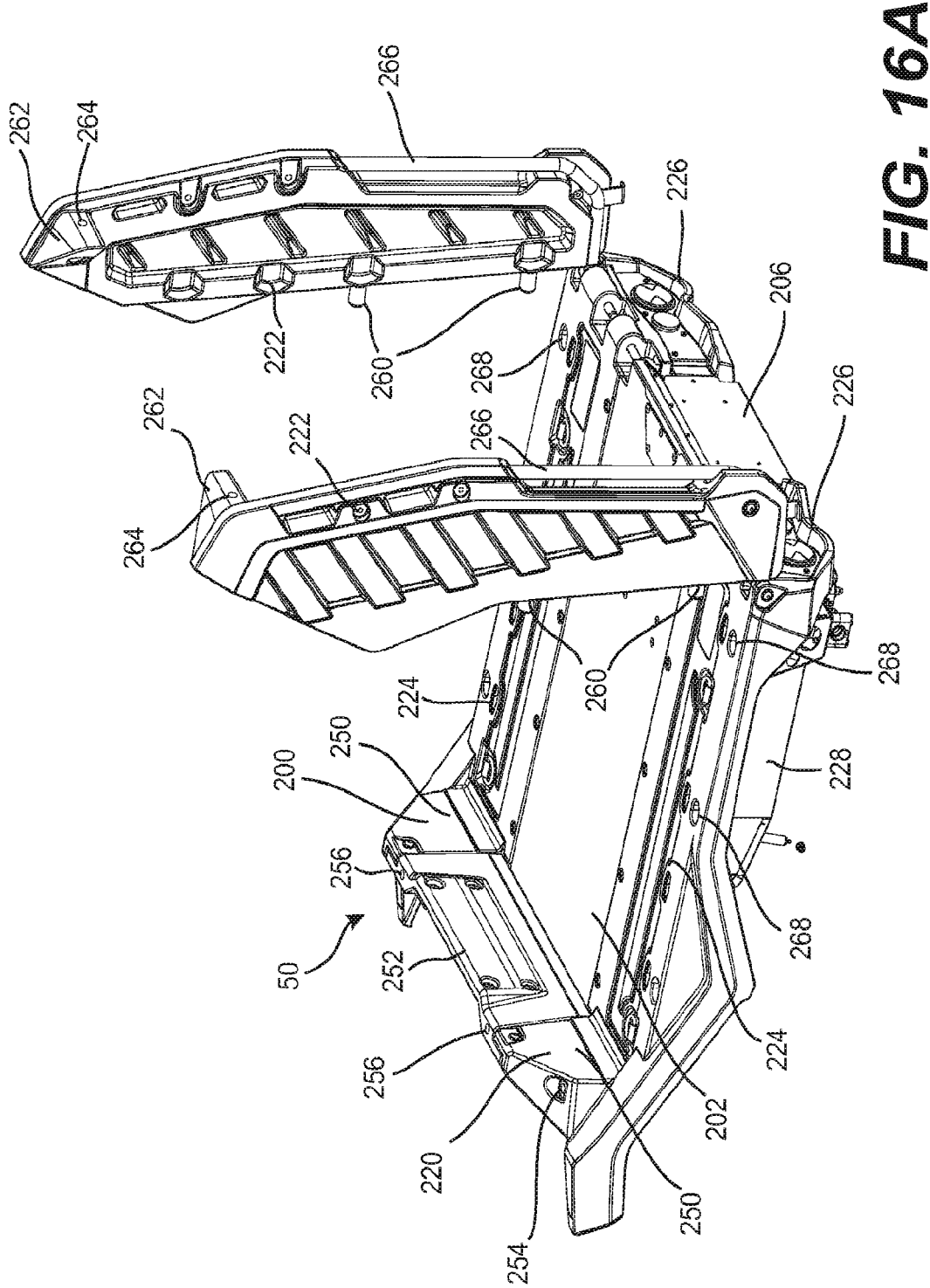
FIGS. 16A and 16B are perspective views taken from a rear, left side of the cargo box of the ATV of FIG. 1 showing steps for installing side walls of the cargo box.

The cargo box body 200 has a front wall 220, two removable side walls 222, left and right upper floors 224, two rear walls 226 and a lower portion 228. The lower portion 228 is received in the space 60 defined by the cargo box supporting frame 58 when the cargo box 50 is in the position shown in the figures. The lower portion 228 has two side walls 230, a lower floor 232 disposed between the side walls 230 and a front wall 234 having a curved portion. As best seen in FIG. 16C, the lower portion 228 tapers toward its front. The cargo box body 200 has an opened side 236 defined between the two rear walls 226 and by the lower floor 232. As will be explained below, the lower tailgate 206 selectively closes the opened side 236. Reflectors and/or lights 238 are connected to the two rear walls 224.

Figure 19:
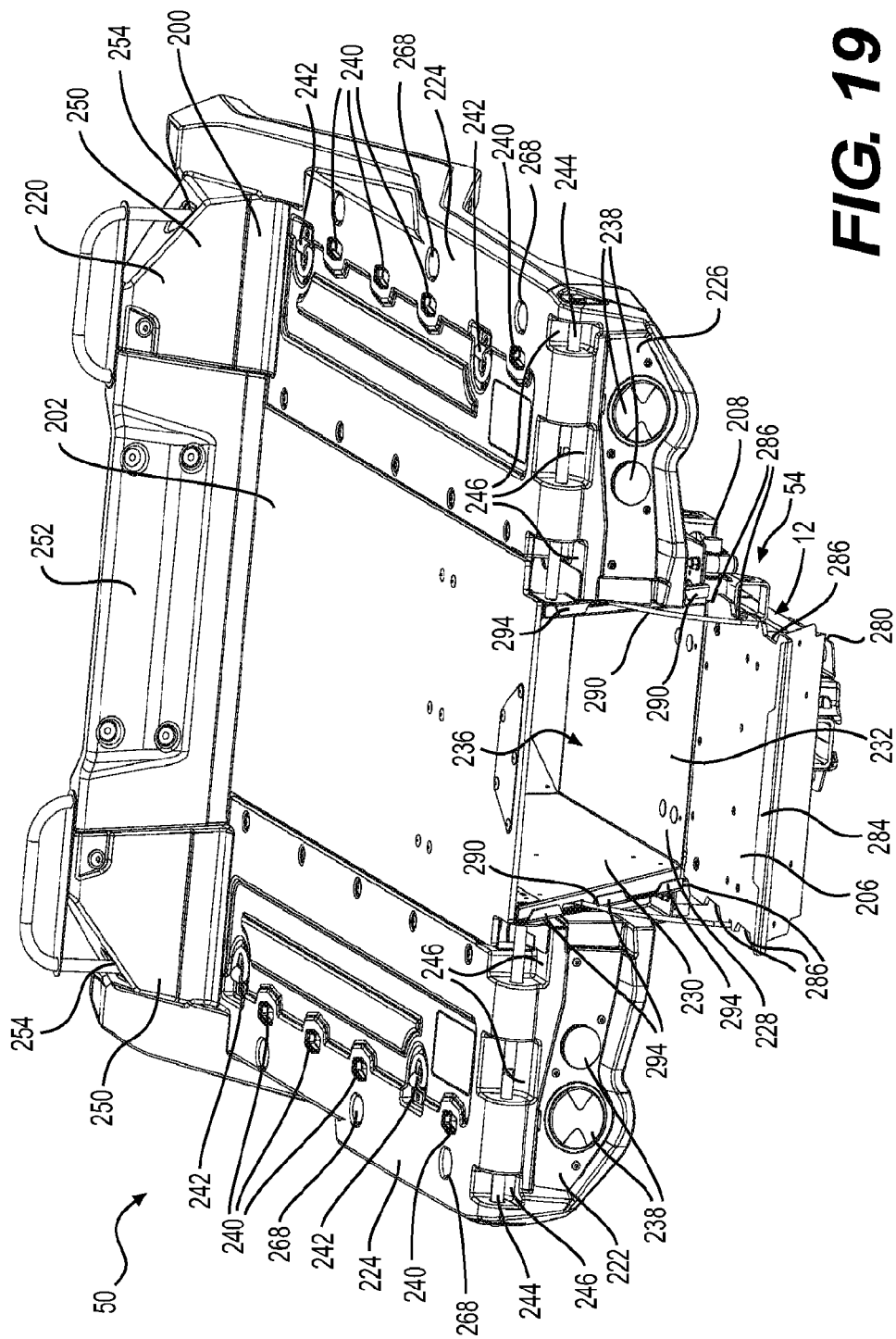
FIG. 19 is a perspective view taken from a rear, right side of the cargo box and frame portion of FIG. 14, with the upper tailgate and side walls removed and a lower tailgate in an open position.
Figure 24:
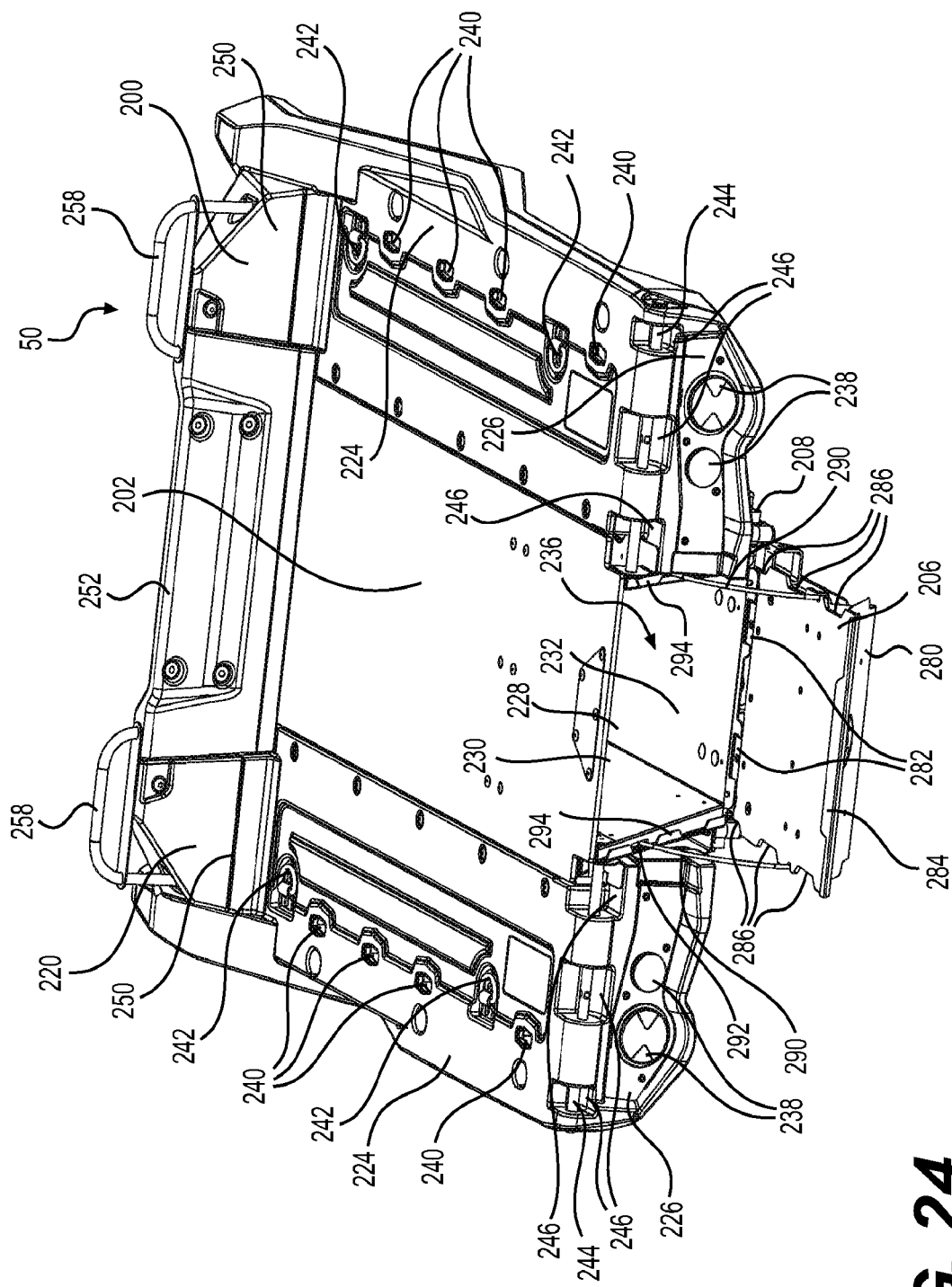
FIG. 24 is a perspective view taken from a rear, right side of the cargo box and frame portion of FIG. 14, with the upper tailgate and side walls removed, the lower tailgate in an open and rearwardly pulled position.

As best seen in FIGS. 19 and 24, each upper floor 224 has four hexagonal apertures 240 and two attachment loops 242. The hexagonal apertures are adapted to receive anchors of the type described in United States Patent Publication No. US 2013/0094920 A1, published Apr. 18, 2013. The anchors are used to attach various items to the cargo box 50. The attachment loops 242 are also used to attach various items to the cargo box 50. Two shafts 244 are inserted through the rear ends of the upper floors 224. It is contemplated that there could be more or less than four apertures 240 on each upper floor 224 or that they could be omitted. It is contemplated that there could more or less than two attachment loops 242 on each upper floor 224 or that they could be omitted. Recesses 246 formed at the rear ends of the upper floors 224 permit the upper tailgate 204 to pivotally attach to the shafts 244 as will be described in greater detail below. Each upper floor 224 also defines a step 248 (FIG. 20) on which the removable cover 202 rests.

The front wall 220 of the cargo box body 200 has two outer wall portions 250 and a central removable wall portion 252. The central wall portion 252 is fastened to the outer wall portion 250. As can be seen in FIG. 16A, each outer wall portion 250 has an aperture 254 defined therethrough and the central wall portion 252 has an aperture 256 defined near each lateral side thereof. Two U-shaped bars 258 are connected to the front wall 220. Each U-shaped bar 258 has one arm inserted in an aperture 254 and another arm inserted in an aperture 256. The U-shaped bars 258 are used to attach the side walls 222 to the rest of the cargo box body 200 as will be described below. The U-shaped bars 258 can also be used when the side walls 222 are removed, thereby acting as handles. The U-shaped bars 258 do not need to be installed when the side walls 222 are removed.

The side walls 222 each have two posts 260 (FIG. 16D) extending from a bottom thereof. Each side wall 222 also has a laterally inwardly extending triangular portion 262 at a front thereof. Each triangular portion 262 has an aperture 264 (FIG. 16D) extending therethrough. A rail 266 also extends along a top of a rear portion of each side wall 222 and then extends down the rear portion of each side wall 222. A hook 267 (FIG. 16D) attaches to the bottom end of each rail 266.

Figure 16B:
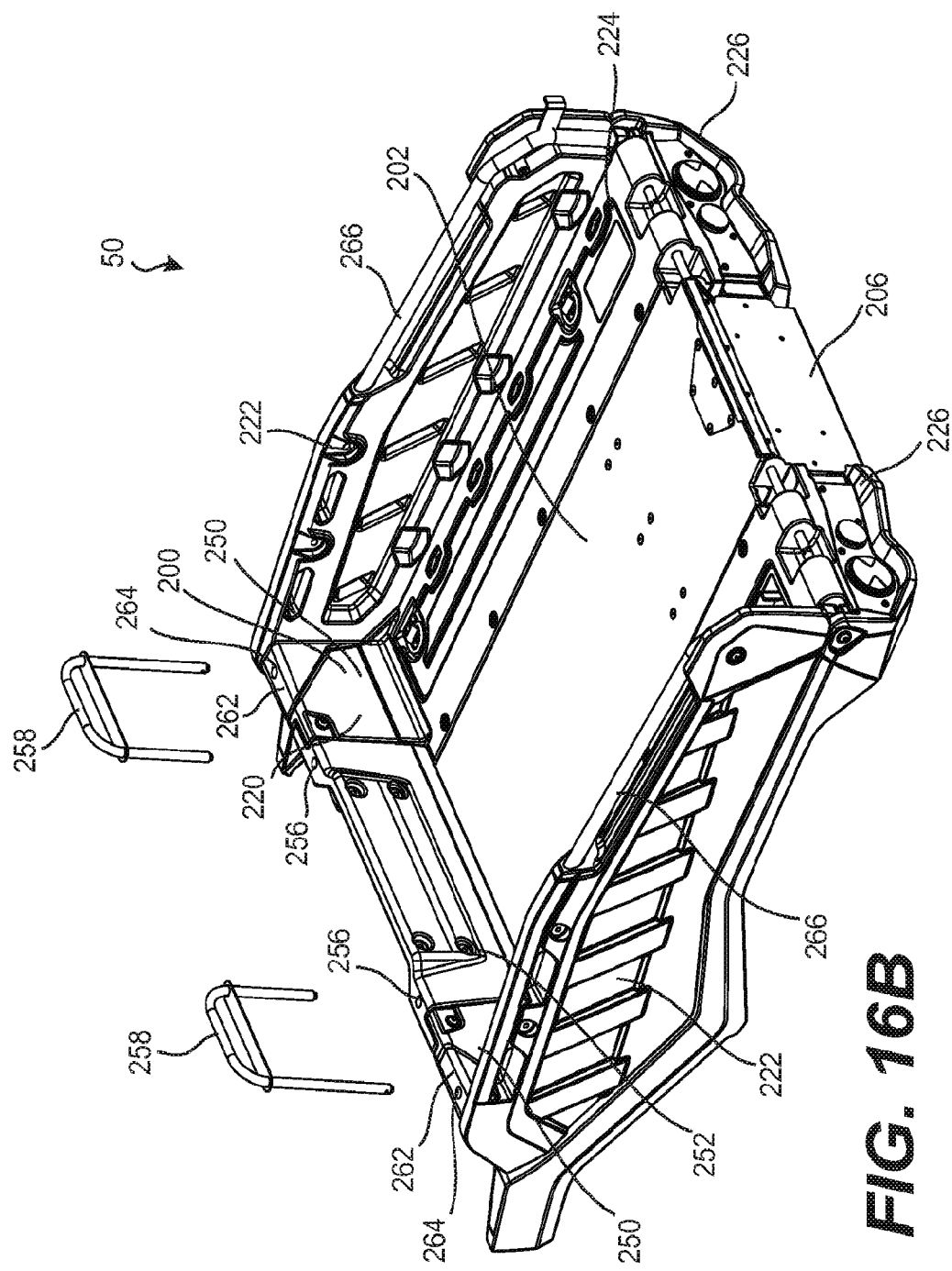
Figure 16C:
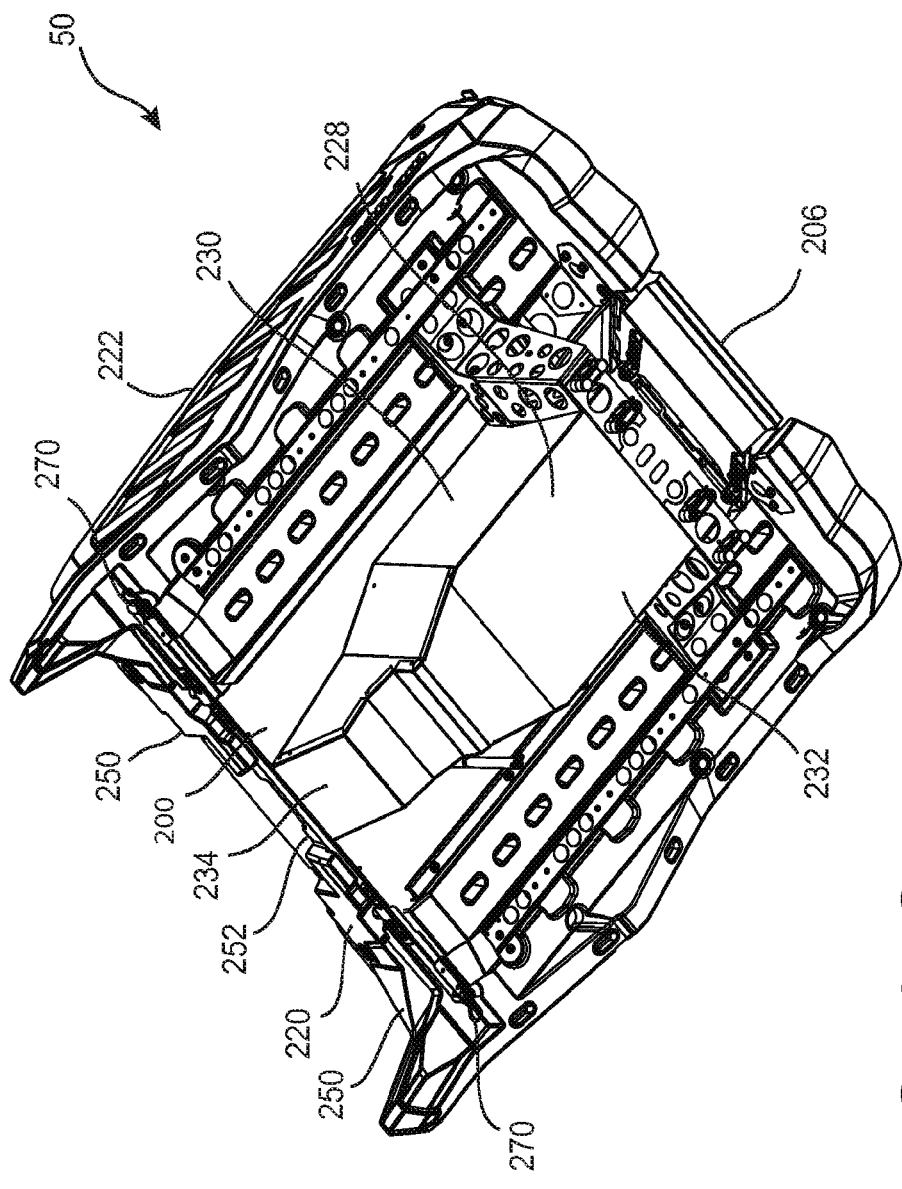
FIG. 16C is a perspective view taken from a bottom, front, left side of the cargo box of the ATV of FIG. 1 showing a final step for installing side walls of the cargo box.

Turning now to FIGS. 16A to 16C, the method of installing one of the side walls 222 to the remainder of the cargo box body 200 will be described. It should be understood that the other one of the side walls 222 is installed in the same manner. The U-shaped bar 258 is first removed from the cargo box body 200. The side wall 222 is first hooked to the shaft 244 using the hook 267 as shown in FIG. 16A. The side wall 222 is then pivoted down on top of its corresponding upper floor 224 such that the posts 260 are received in apertures 268 defined in the upper floor 224 and that the triangular portion 262 of the side wall 222 rests on top of its corresponding outer wall portion 250 as shown in FIG. 16B. In this position the aperture 264 of the triangular portion 262 is aligned with the aperture 254 of the outer wall portion 250. The U-shaped bar 258 is then installed. The short arm of the U-shaped bar 258 is inserted in the aperture 256 of the central wall portion 252. The long arm of the U-shaped bar 258 is inserted through the aperture 264 of the triangular portion 262 and the aperture 254 of the outer wall portion 250. When the U-shaped bar 258 is installed, the long arm of the U-shaped bar 258 extends below the front wall 220. A cotter pin 270 (FIG. 16C) is inserted through the long arm of the U-shaped bar 258 to secure the U-shaped bar 258 to the front wall 220, and thereby secure the side wall 222 to the remainder of the cargo box body 200.

To remove one of the side walls 222, the upper tailgate 204 is removed as described below, the cotter pin 270 is then removed, the U-shaped bar 258 is then pulled out of the front wall 220, thereby permitting removal of the side wall 222. When the side walls 222 are removed and the cover 202 is in place as shown in FIG. 19, the upper floors 224 and the cover 202 form a flatbed.

Figure 14:
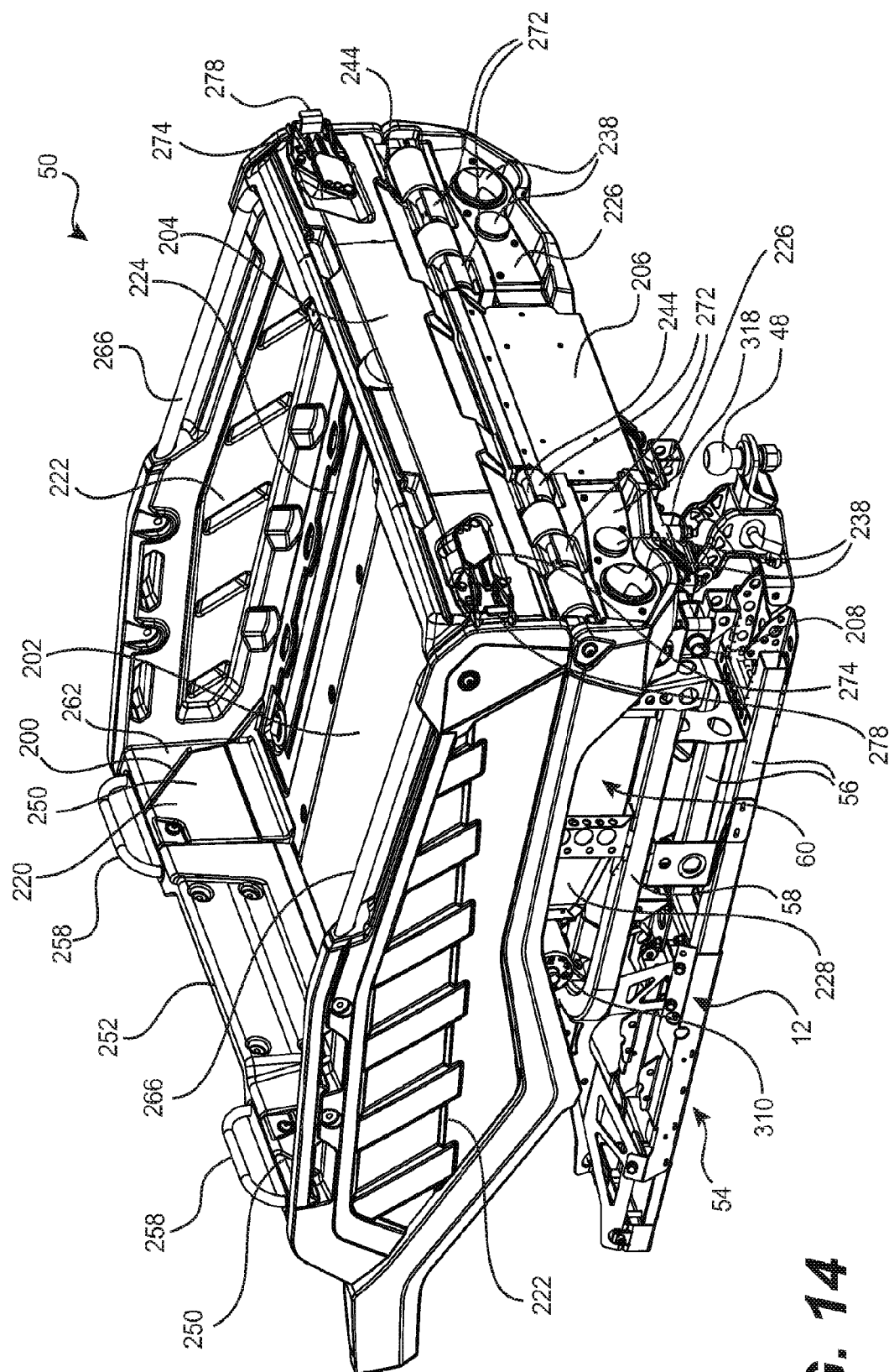
FIG. 14 is a perspective view taken from a rear, left side of a cargo box and a frame portion of the ATV of FIG. 1.

The upper tailgate 204 has four hooks 272 extending from a bottom thereof. The hooks 272 are sized to be received in four corresponding recesses 246 of the cargo box body 200. It is contemplated that the upper tailgate 204 could have more or less than four hooks 272 in which case the cargo box body 200 would have at least a corresponding number of recesses 246. The hooks 272 are shaped such that when the upper tailgate 204 is installed and closed as shown in FIG. 14 they extend down from the bottom of the tailgate 204, then downward and rearward under the shafts 244 and then upwardly above the shafts 244. Two latches 274 are fastened to the back of the tailgate 204.

Figure 15A:
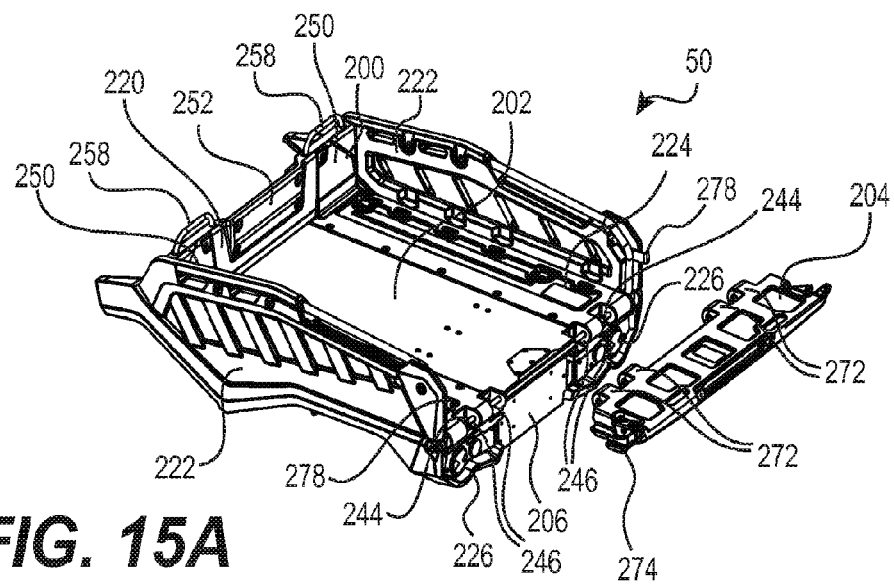
FIGS. 15A to 15C are perspective views taken from a rear, left side of the cargo box of the ATV of FIG. 1 showing steps for installing the upper tailgate of the cargo box.
Figure 15B:
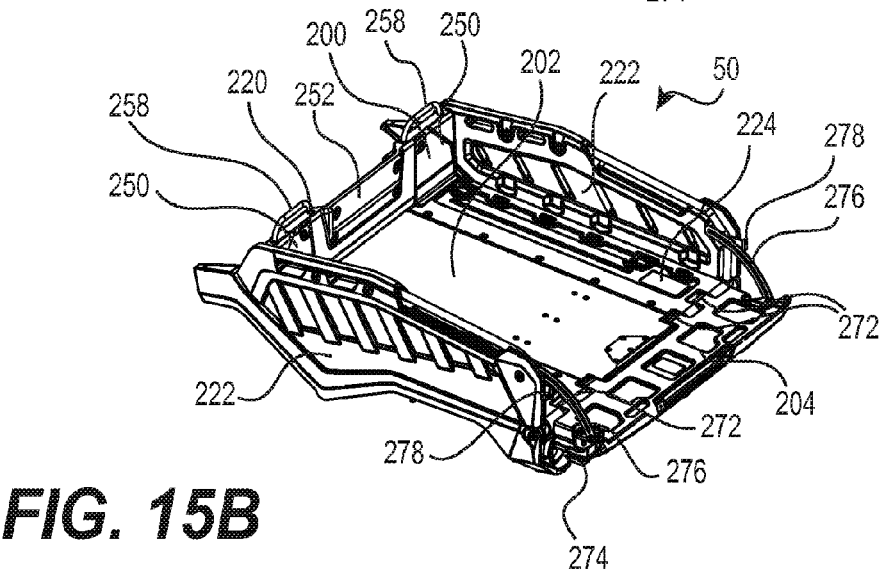
Figure 15C:
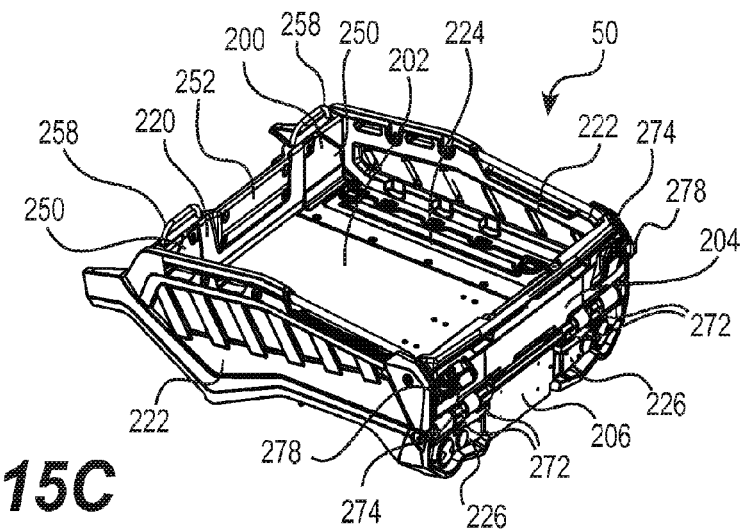

Turning to FIGS. 15A to 15C, the method of installing the upper tailgate 204 will be described. In order to install the upper tailgate 204, the side walls 222 need to be installed on the cargo box body 200. The upper tailgate 204 is first oriented such that the hooks 272 are slightly raised compared to the rest of the upper tailgate 204 as shown in FIG. 15A. With the upper tailgate 204 in this orientation, the hooks 272 are inserted in the recesses 246 of the cargo box body 200 and hooked around the shafts 244. As shown in FIG. 15B, guide rails 276 are connected between the upper tailgate 204 and the side walls 222. The guide rails 276 slide relative to the side walls 222 as the upper tailgate 204 is opened and closed. The upper tailgate 204 can now be pivoted about the shafts 244 between its opened position (FIG. 15B) and its closed position (FIG. 15C). To lock the upper tailgate 204 in its closed position, the latches 274 are attached to hooks 278 extending from the back of the side walls 222.

To remove the upper tailgate 204, the latches 274 are disconnected from the hooks 278. The upper tailgate 204 is then opened as shown in FIG. 15B. The guide rails 276 are removed. The upper tailgate 204 is then angled such that the hooks 272 can be disengaged from the shafts 244 thereby permitting removal of the upper tailgate 204.

Figure 25:
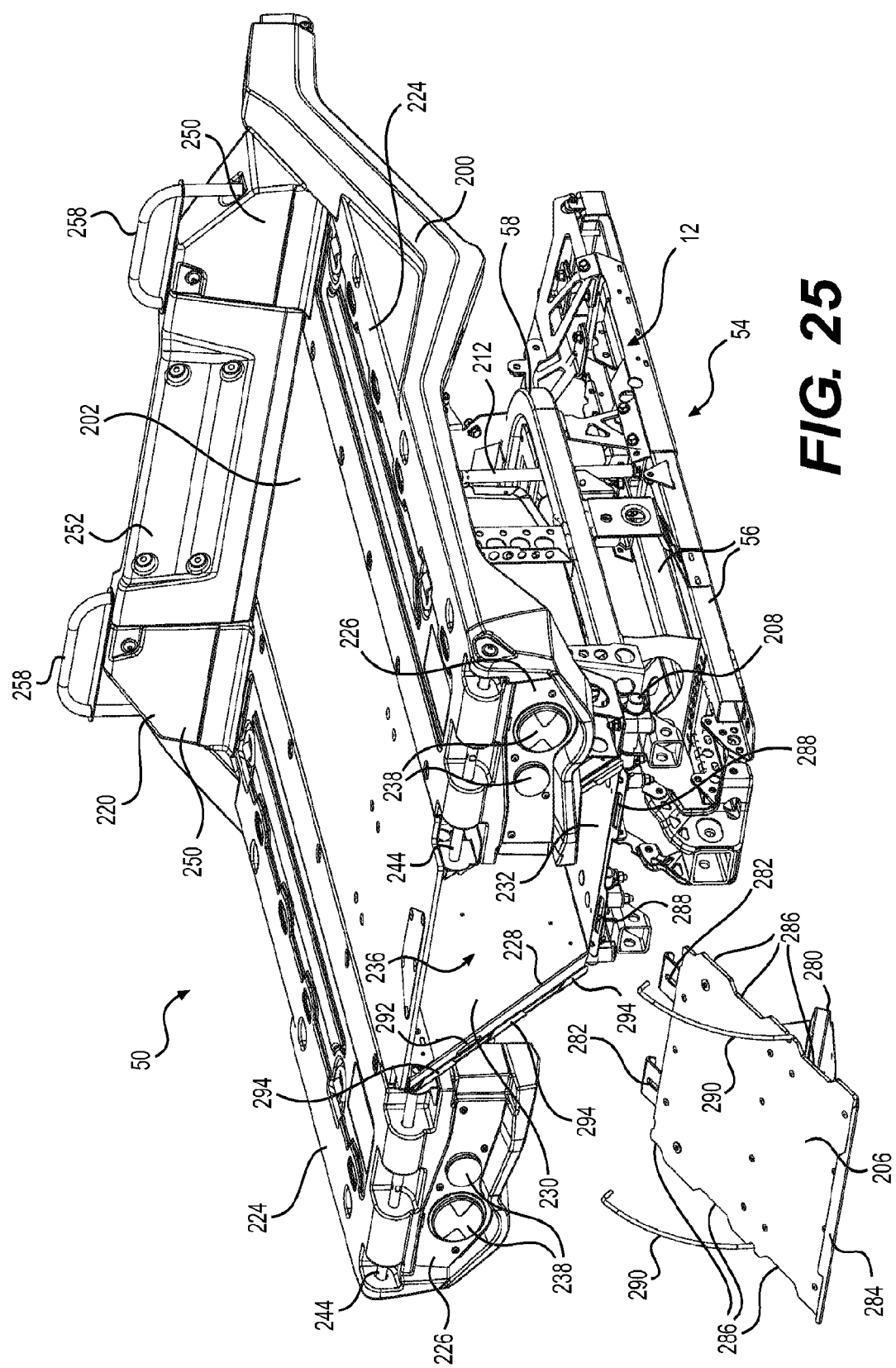
FIG. 25 is a perspective view taken from a rear, right side of the cargo box and frame portion of FIG. 14, with the upper tailgate and side walls removed, and the lower tailgate shown removed from the cargo box body.

As best seen in FIG. 25 and with reference to an orientation of the lower tailgate 206 when it is in a closed position, the lower tailgate 206 has a handle 280 on a rear thereof, two tabs forming hooks 282 extending from a bottom thereof, a locking tab 284 extending from a top thereof, and three recesses 286 defined in each side thereof. The hooks 282 are received in slots 288 (FIG. 25) defined in downwardly extending portion of the rear end of the lower floor 232 of the cargo box body 200. Two curved rails 290 having hooked ends are connected near a middle of the lower tailgate 206 and have their hooked ends inserted in apertures 292 (FIG. 25) defined in the rear ends of the walls 230 of the cargo box body 200. Each wall 230 also has three tabs 294 extending toward the other one of the walls 230. It is contemplated that each wall 230 could have more or less than three tabs 294, in which case the lower tailgate 206 would have a corresponding number of recesses 286 on each side thereof. Two deformable rubber latches 296 (FIG. 17) fasten the lower tailgate 206 to the cargo box body 200.

Figure 17:
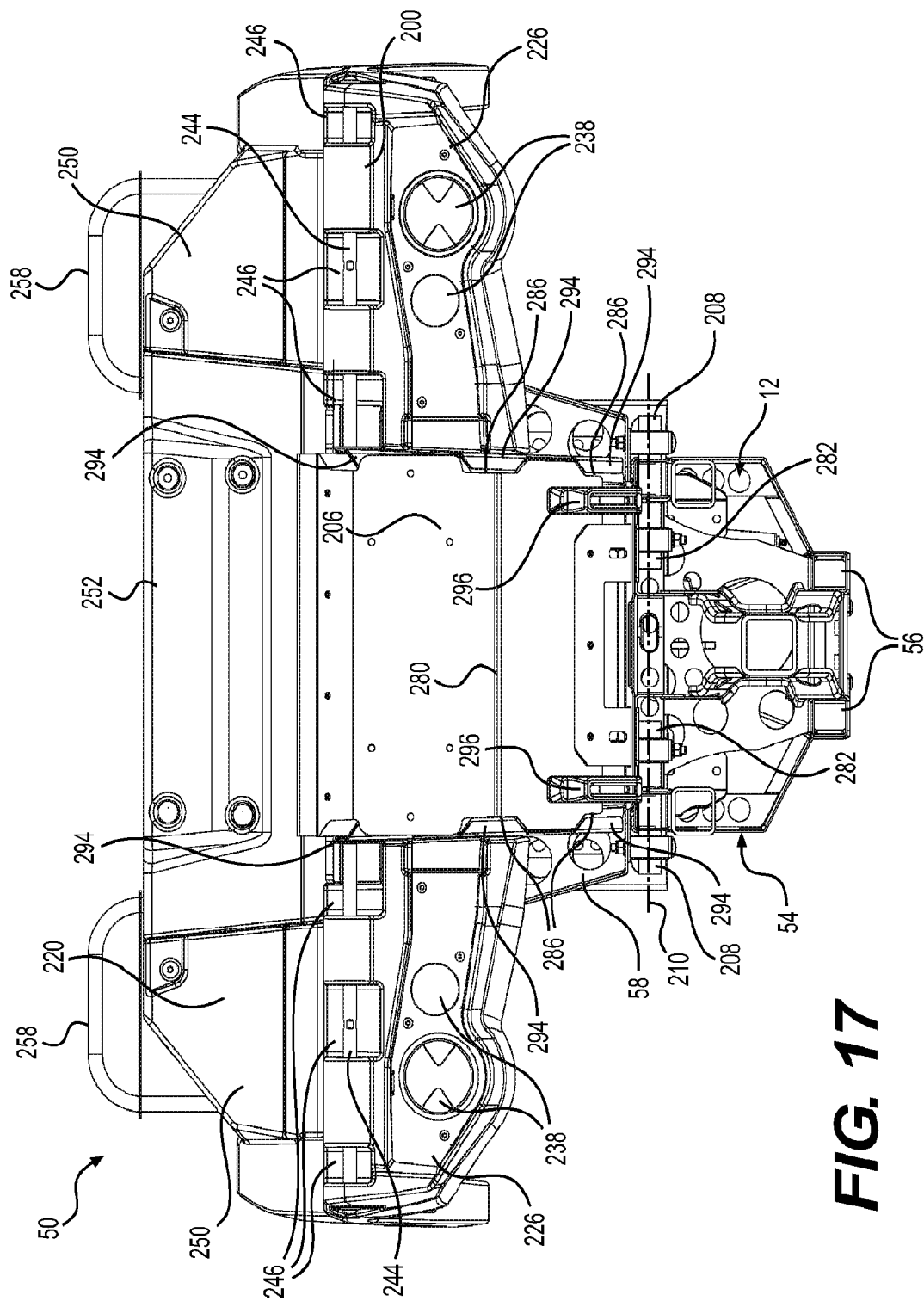
FIG. 17 is a rear elevation view of the cargo box and frame portion of FIG. 14.
Figure 18:
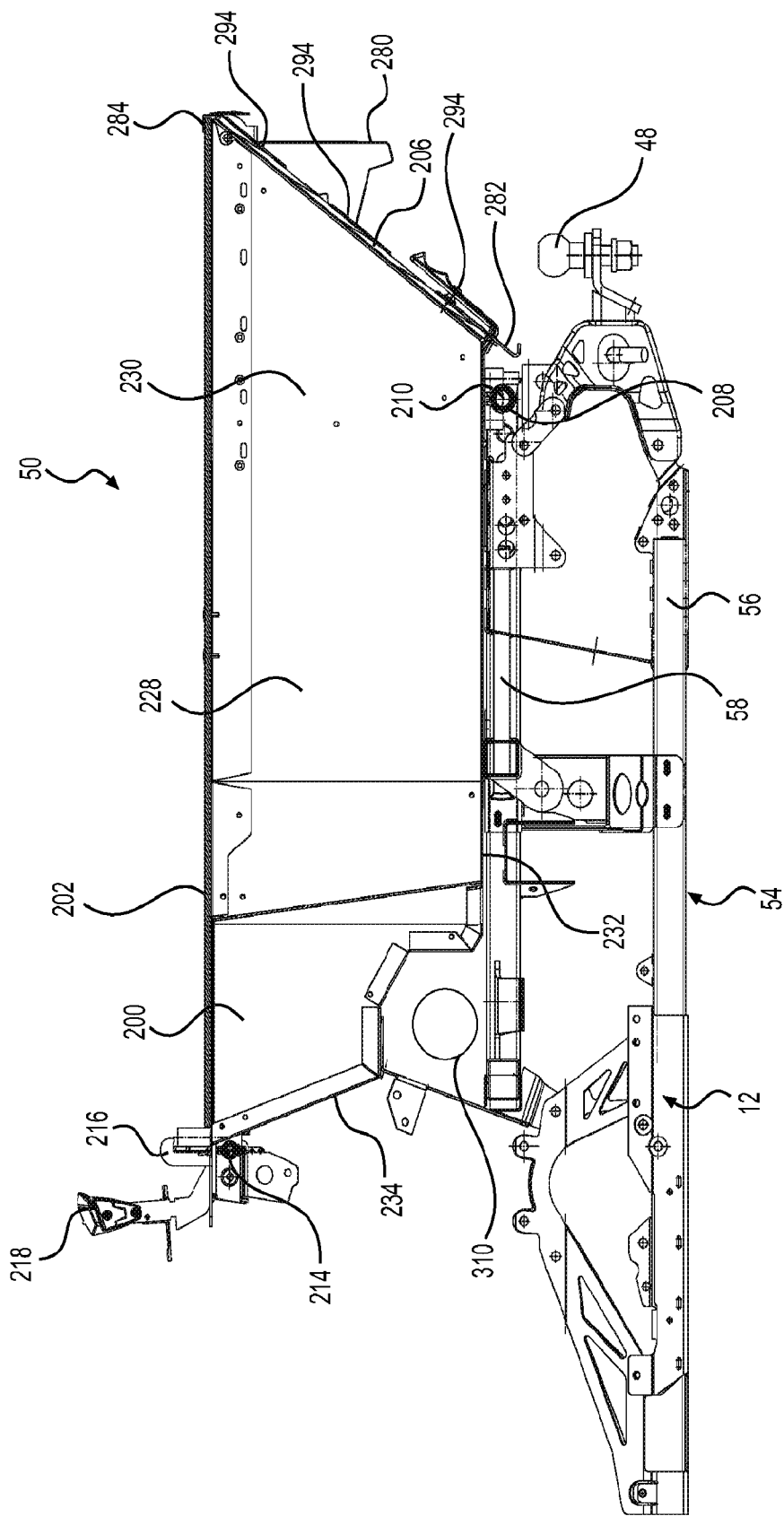
FIG. 18 is a cross-sectional view of the cargo box and frame portion of FIG. 14.

When the lower tailgate 206 is in the closed position shown in FIGS. 14 and 18, the tabs 294 overlap the lower tailgate 206 thereby preventing the lower tailgate 206 from pivoting to the opened position. To open the lower tailgate 206, the lower tailgate 206 is first slid generally vertically upwardly to align the recesses 286 of the lower tailgate 206 with the tabs 294 as shown in FIG. 17, thereby permitting pivoting of the lower tailgate 206 to the opened position. It should be noted that the latches 296 bias the lower tailgate 206 downward against the floor 232 to prevent the lower tailgate 206 from accidentally sliding up and opening during operation of the ATV 10. The lower tailgate 206 is then pivoted away from the cargo box body 200 as shown in FIG. 19. The hooked ends of the curved rails 290 limit the amount by which the lower tailgate 206 can be pivoted away from the cargo box body 200. To close the lower tailgate 206, the above steps are repeated in the reverse order (and reverse direction).

To remove the lower tailgate 206 from the cargo box body 200, the lower tailgate 206 has to be place in the opened position as indicate above, but the latches 296 have to first be unfastened from the lower tailgate 206. Once the lower tailgate 206 is in the opened position, the hooked ends of the curved rails 290 are removed from inside the apertures 292 and then, as shown in FIG. 24, the lower tailgate 206 is pulled rearward away from the cargo box body 200. The lower tailgate 206 is then pivoted further downward to unhook the hooks 282 of the lower tailgate 206 from the slots 288 in the lower floor 232 thereby removing the lower tailgate 206 from the cargo box 50. To install the lower tailgate 206, the above steps are repeated in the reverse order (and reverse direction).

Figure 20:
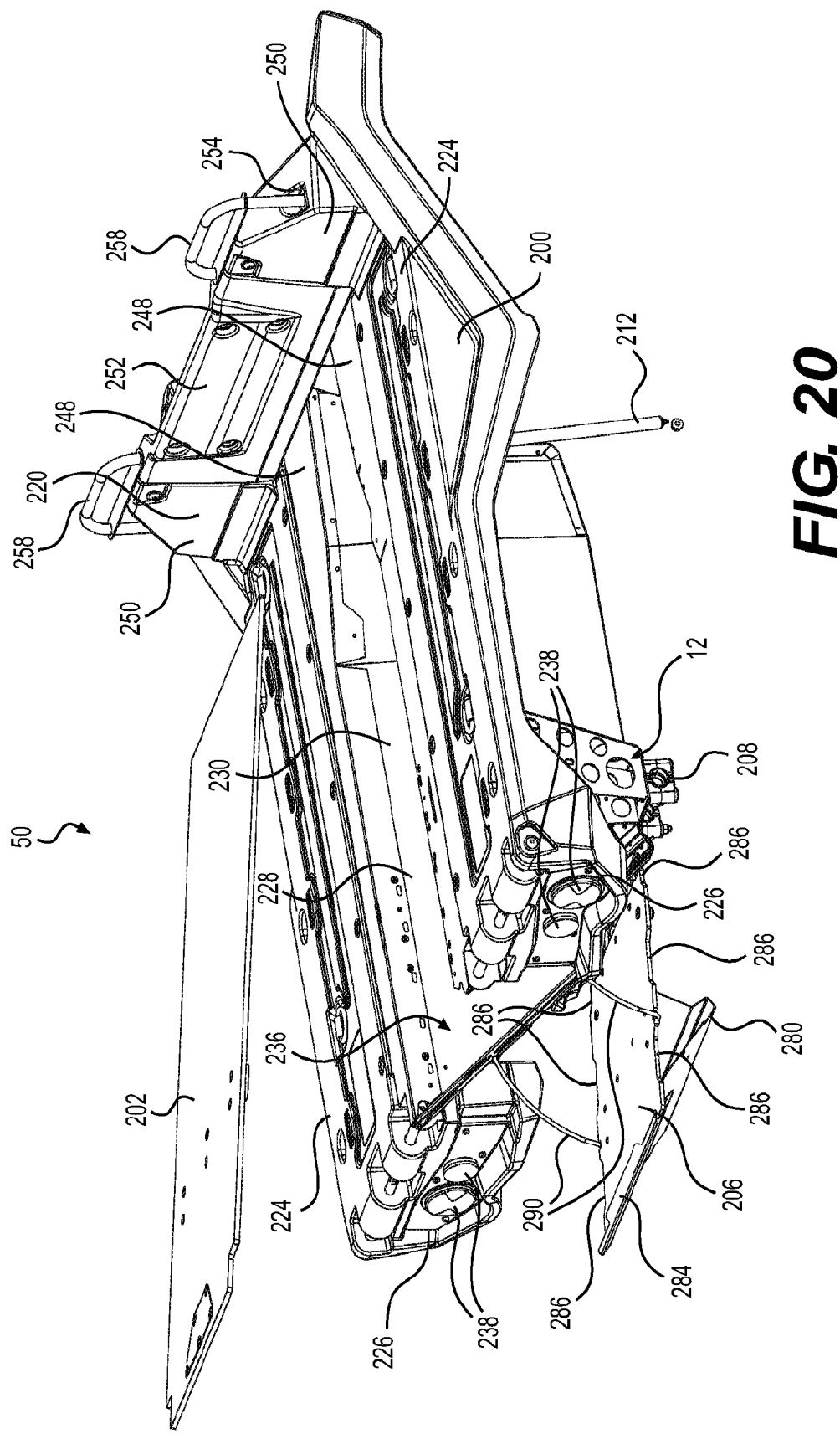
FIG. 20 is a perspective view taken from a rear, right side of the cargo box elements of FIG. 19 with the lower tailgate in an open position and a cover removed.
Figure 21:
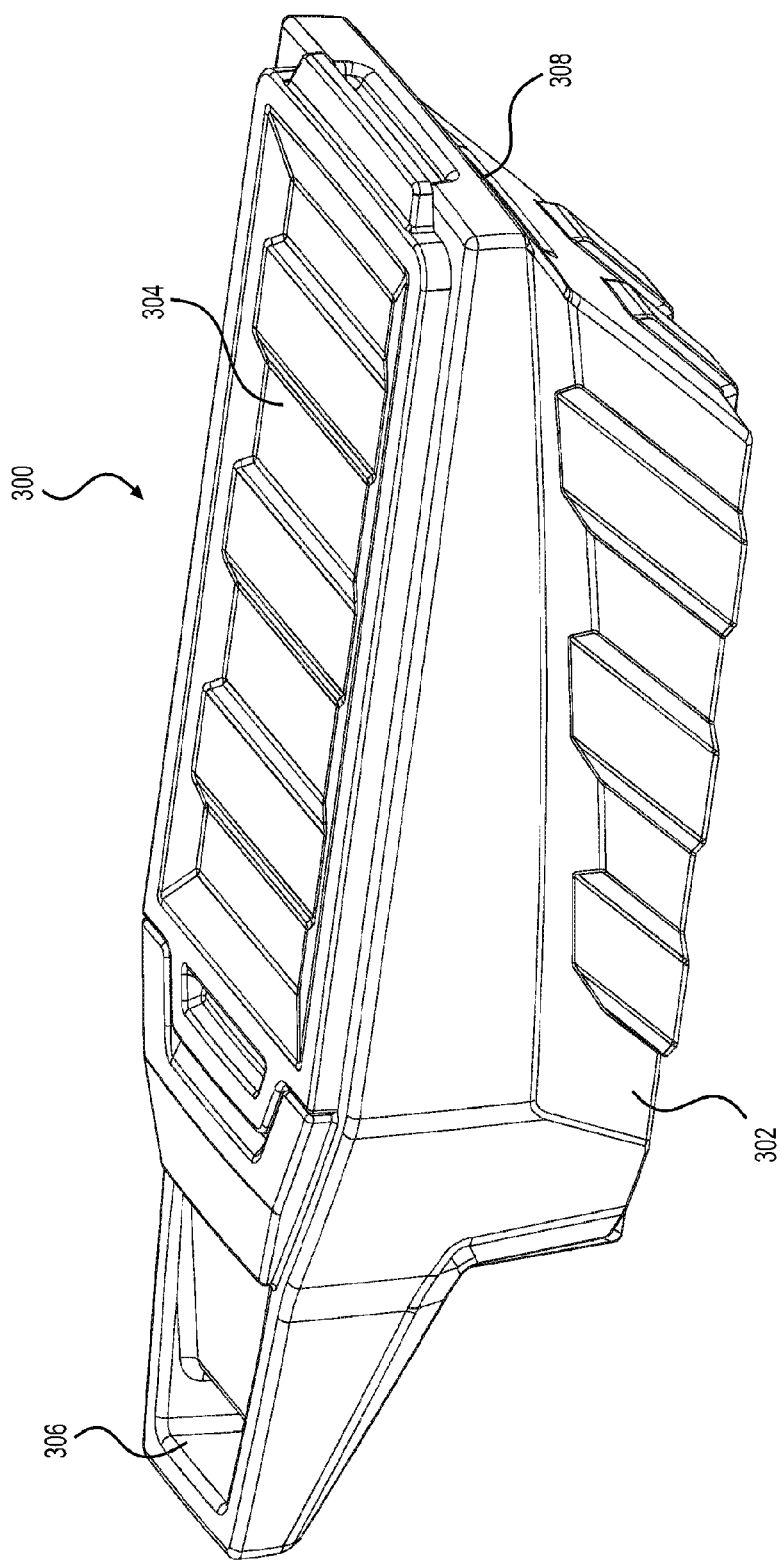
FIG. 21 is a perspective view taken from a rear, left side of a storage box adapted to be received in the cargo box of the ATV of FIG. 1.

As indicated above, the cover 202 rests on the steps 248 (FIG. 20). The front end of the cover 202 is disposed under the central wall portion 252 as can be seen in FIG. 19. When the lower tailgate 206 is closed, the locking tab 284 of the lower tailgate 206 overlaps the rear end of the cover 202 as can be seen in FIG. 18, thereby preventing the cover 202 from being lifted and removed. It is contemplated that instead of being removable, the cover 202 could be pivotally connected along its front end or one of its sides to the cargo box body 200 via a hinge for example.

Figure 22:
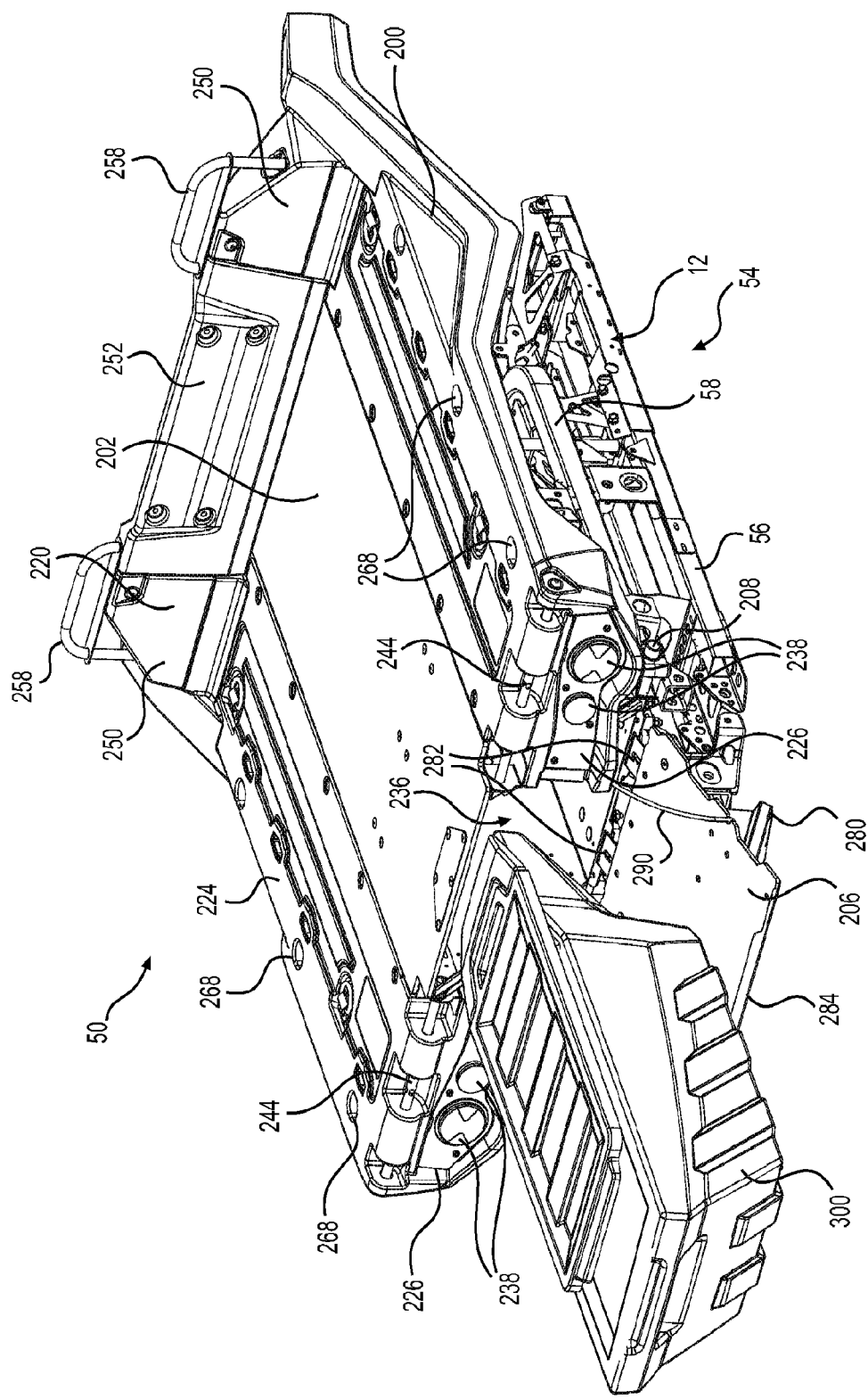
FIG. 22 is a perspective view taken from a rear, right side of the cargo box and frame portion of FIG. 14, with the upper tailgate and side walls removed, the lower tailgate in an open position and the storage box of FIG. 21 being inserted in the cargo box, with the lid of the storage box being partially slid forward.
Figure 23:
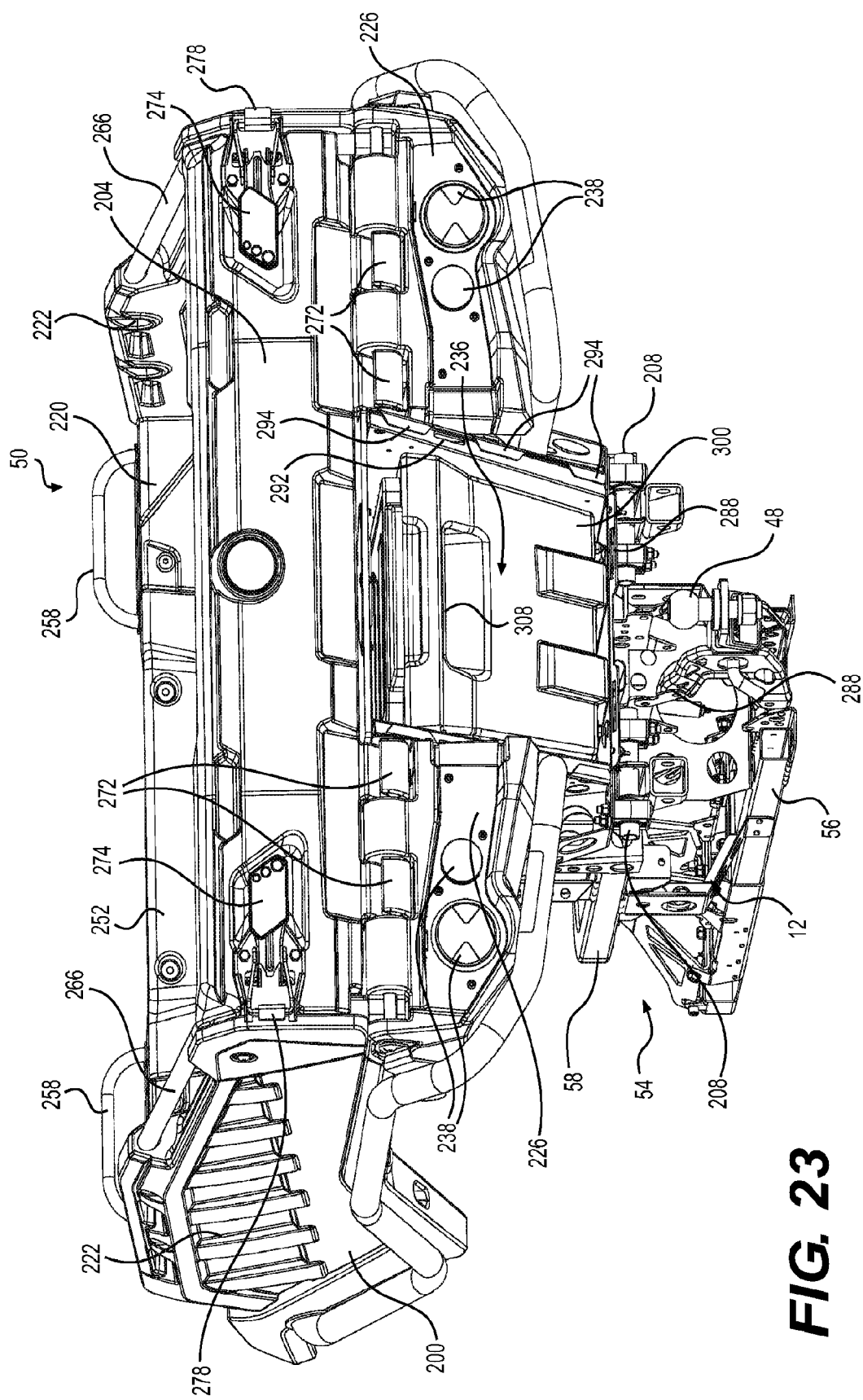
FIG. 23 is a perspective view taken from a rear, left side of the cargo box and frame portion of FIG. 14, with the lower tailgate removed for clarity and the storage box of FIG. 21 in the cargo box.

The cover 202, the side walls 230, the lower floor 232 and the front wall 234 define a cargo space therebetween. The cargo space can receive many items therein. These items can be accessed, inserted in the cargo space, and removed from the cargo space by opening the lower tailgate 206, and if necessary or convenient, by lifting or completely removing the cover 202. Although any item whose dimensions are smaller than those of the cargo space can be placed in the cargo space, a storage box 300 shown in FIG. 21 has been specifically designed to be inserted in the cargo space. The storage box 300 has a storage box body 302 and a removable lid 304. A handle 306 is defined at a front of the storage box body 302. A handle 308 is defined at a rear of the storage box body 302. The shape and dimensions of the storage box 300 have been selected so as to generally follow the shape and dimensions of the cargo space. As a result, when the lower tailgate 206 is closed, the storage box 300 does not move around in the cargo space when the ATV 10 is in operation. FIGS. 22 and 23 show the storage box 300 being inserted in the cargo space and the storage box 300 in the cargo space respectively. The handle 308 allows the storage box 300 to be easily pulled out of the cargo space. It is contemplated that when the lower tailgate 206 is opened, the storage box 300 can be pulled out of the cargo space so as to partially rest on the lower tailgate 206. The lid 304 can then be slid forward (as in FIG. 22 for example) so as to provide access to the contents of the storage box 300.

Figure 26:
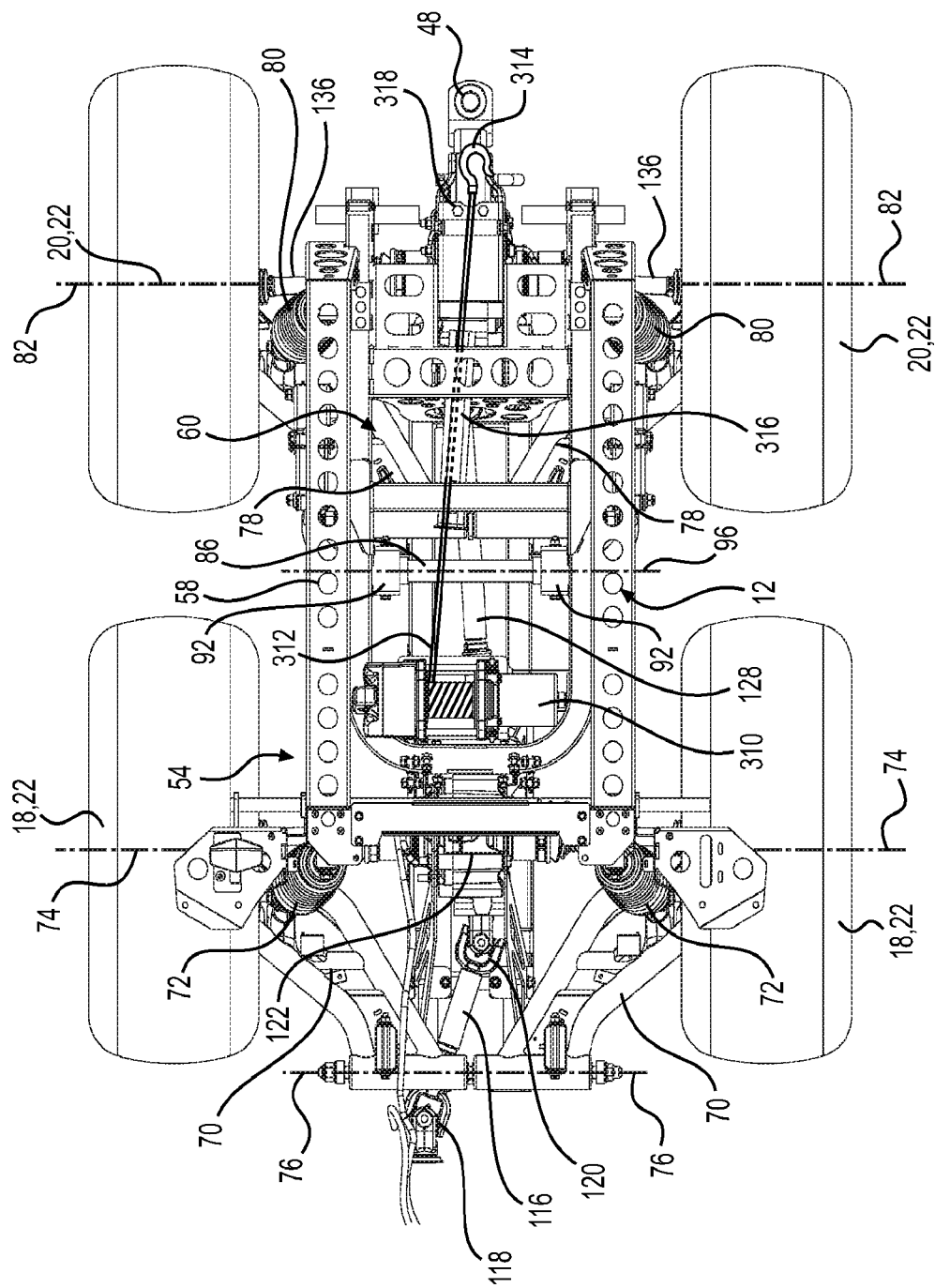
FIG. 26 is a top plan view of a rear frame portion, the intermediate and rear wheels and suspensions, a portion of the drive assembly and a rear winch assembly of the ATV of FIG. 1.

Turning now to FIG. 26, a rear winch assembly of the ATV 10 will be described. The rear winch assembly includes a winch motor 310, a cable 312 and a hook 314. The winch motor 310 is mounted to the cargo box supporting frame 58 under a portion of the cargo box 50. More specifically, the winch motor 310 is disposed below the curved portion of the wall 234 of the cargo box body 200 as shown in FIG. 18 (with the winch motor 310 schematically illustrated). The winch motor 310 is disposed rearward of the intermediate wheel axes 74 and forward of the sway bar axis 96. In alternative implementations, the winch motor 310 is mounted to the frame 12 rearward of the intermediate wheel axes 74 and forward of the rear wheel axes 82. In other alternative implementations, the winch motor 310 is mounted to the frame 12 rearward of the front wheel axes 68 and forward of the rear wheel axes 82. The cable 312 is wound in part around the winch motor 310 and passes through a tube 316 a guide roller assembly 318 (best seen in FIG. 7) connected to the frame 12 to connect to the hook 314.

Figure 27:
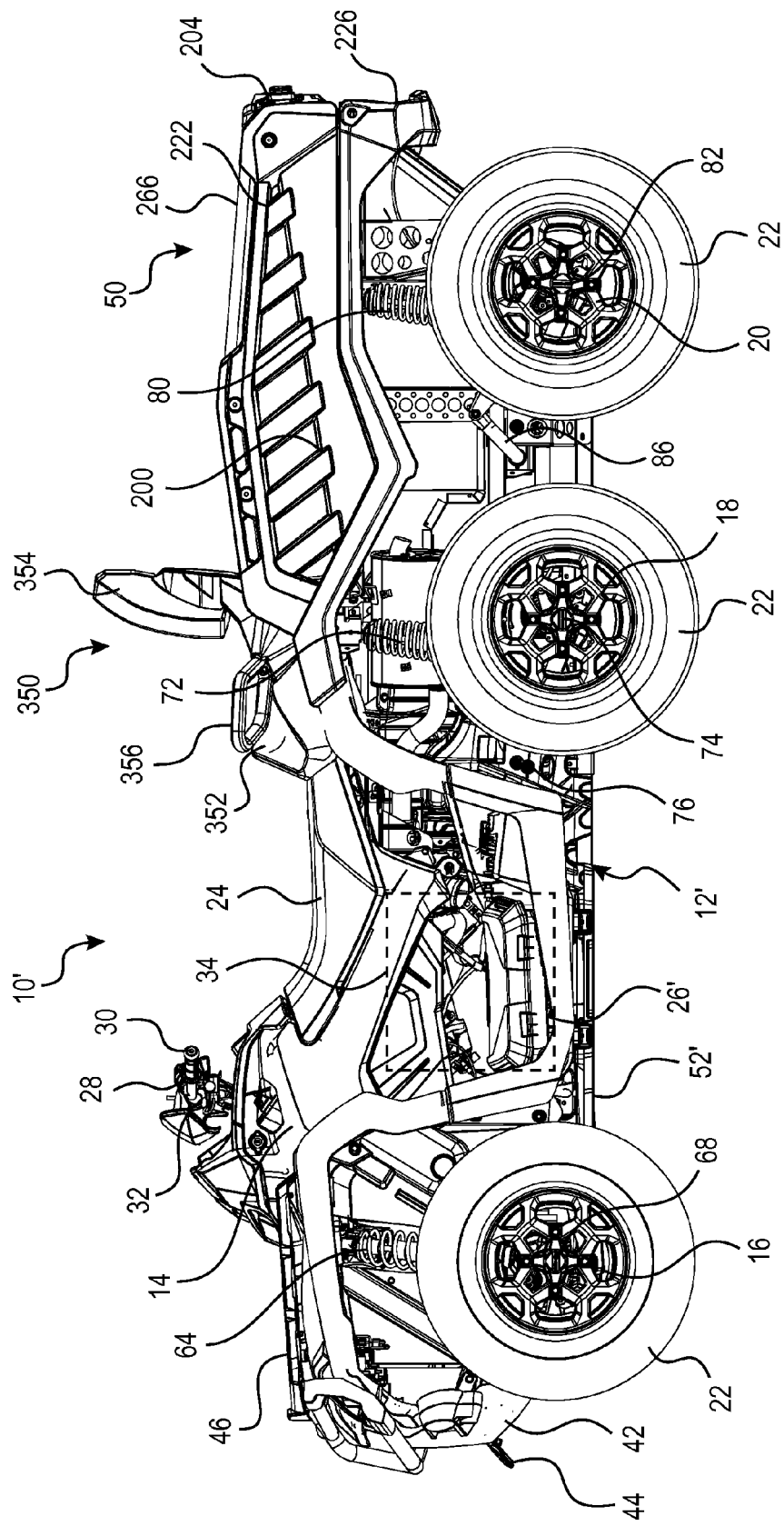
FIG. 27 is a left side elevation view of an alternative implementation of the six-wheel ATV of FIG. 1.
Figure 28:
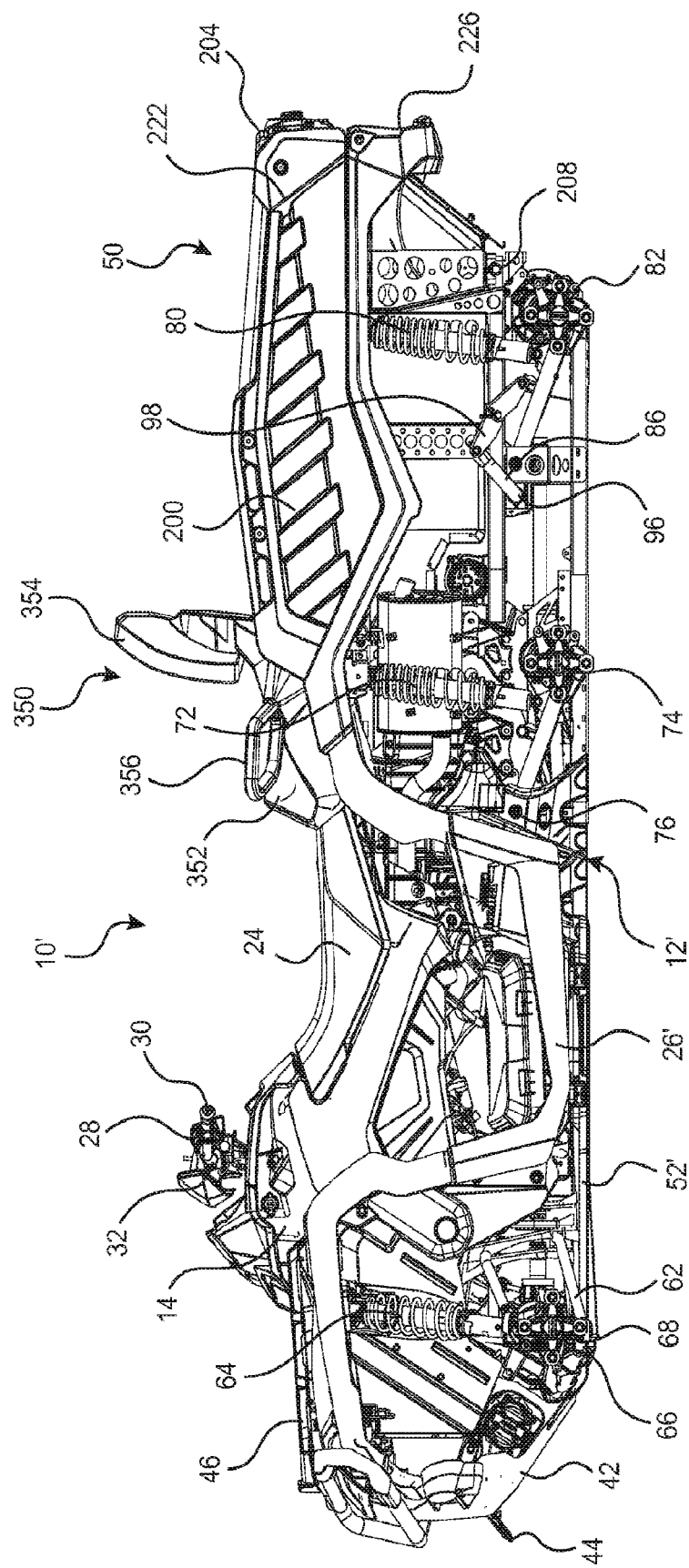
FIG. 28 is a left side elevation view of the ATV of FIG. 27 with the wheels removed.

Turning now to FIGS. 27 and 28, an ATV 10' will be described. The ATV 10' is an alternative implementation of the ATV 10 described above. For simplicity, elements of the ATV 10' that are similar or identical to those of the ATV 10' have been labelled with the same reference numerals and will not be described again.

The ATV 10' has a frame 12' in which the front frame portion 52' is longer than the front frame portion 52 of the ATV 10. As a result, the distance between the front wheel axes 68 and the intermediate wheel axes 74 is greater than in the ATV 10. The distance between the intermediate wheel axes 74 and the rear wheel axes 82 is the same as in the ATV 10, but it is contemplated that it could be different. The footrests 26' of the ATV 10' are also longer than the footrests 26 of the ATV 10.

The ATV 10' has a passenger seat 350 removably connected to the ATV 10'. The seat 350 is removably connected to one or more of the seat 24, the vehicle body 14 and the frame 12. It is contemplated that the passenger seat 350 could be fixedly connected to one or more of these elements. It is also contemplated that the driver seat 24 and the passenger seat 350 could be integrally formed. The driver and passenger seats 24, 350 are both laterally centered about the longitudinal centerline of the ATV 10'. As can be seen, a majority of the passenger seat 350 is disposed rearward of the driver seat 24. The front portion of the passenger seat 350 overlaps the rear portion of the driver seat 24. The passenger seat 350 is a straddle seat having a seat bottom 352 and a seat back 354. It is contemplated that the seat back 354 could be omitted. As can be seen, the seat bottom 352 is vertically higher than the driver seat 24. Grab handles 356 are provided on either side of the seat bottom for the passenger to hold onto.

The passenger seat 350 is completely rearward of the engine 34 (schematically illustrated in FIG. 27). A portion of the passenger seat 350 is disposed rearward of the intermediate wheel axes 74, but a majority of the passenger seat 350 is disposed forward of the intermediate wheel axes 74. A majority of the seat bottom 352 is disposed longitudinally between the intermediate wheel axes 74 and the swing arm axis 76. A portion of the cargo box 50 extends forward of the rear portion of the passenger seat 350. In one implementation, the central wall portion 252 of the front wall 220 of the cargo box body 200 has to be removed in order to accommodate the passenger seat 350.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   a motor connected to the frame;
   two front wheels operatively connected to the frame;
   two intermediate wheels operatively connected to the frame, the two intermediate wheels being disposed rearward of the two front wheels, the intermediate wheels rotating about intermediate wheel axes;
   two rear wheels operatively connected to the frame, the two rear wheels being disposed rearward of the intermediate wheels;
   a driver seat connected to the frame;
   a passenger seat disposed at least in part rearward of the driver seat, the driver seat and the passenger seat being straddle seats, at least a majority of the passenger seat being disposed forward of the intermediate wheel axes, the passenger seat having a seat bottom and a seat back, the seat bottom of the passenger seat being vertically higher than the driver seat, a rear surface of the seat back being rearward of the intermediate wheel axes and forward of the two rear wheels; and
   a cargo box pivotally connected to the frame about a pivot axis, the passenger seat being disposed at least in part forward of the cargo box, the cargo box having a floor, a front wall and two side walls.

2. The vehicle of claim 1, wherein the driver and passenger seats are both laterally centered about a longitudinal centerline of the vehicle.

3. The vehicle of claim 1, wherein a majority of the passenger seat is disposed rearward of the driver seat.

4. The vehicle of claim 3, wherein a front portion of the passenger seat overlaps the rear portion of the driver seat.

5. The vehicle of claim 1, further comprising two swing arms connecting the intermediate wheels to the frame, the swing arms pivoting about a swing arm axis;

wherein at least a majority of the seat bottom is disposed longitudinally between the intermediate wheel axes and the swing arm axis.

6. The vehicle of claim 1, further comprising at least one grab handle provided on at least one side of the passenger seat.

7. The vehicle of claim 1, wherein the passenger seat is completely rearward of the motor.

8. The vehicle of claim 1, wherein a portion of the cargo box extends forward of a rear portion of the passenger seat.

9. The vehicle of claim 1,
wherein the passenger seat is disposed completely forward of the pivot axis.

10. The vehicle of claim 1, wherein a top of the driver seat and a top of the seat bottom are vertically higher than the floor of the cargo box.

11. The vehicle of claim 1, wherein:
the intermediate wheel axes are rearward of a front of the cargo box;
the rear wheels rotate about rear wheel axes; and
the rear wheel axes are forward of a rear of the cargo box.

12. The vehicle of claim 1, wherein the front wall of the cargo box defines a laterally centered recess in a front thereof.

13. The vehicle of claim 1, further comprising:
two intermediate swing arms connecting the intermediate wheels to the frame, the intermediate swing arms pivoting about an intermediate swing arm axis; and
two rear swing arms connecting the rear wheels to the frame, the rear swing arms pivoting about a rear swing arm axis;
wherein:
the rear wheels rotate about rear wheel axes;
the rear swing arm axis is forward of the rear wheel axes;
the intermediate wheel axes are forward of the rear swing arm axis; and
the intermediate swing arm axis is forward of the intermediate wheel axes.

14. The vehicle of claim 13, further comprising:
two intermediate shock absorber and spring assemblies connected between the two intermediate swing arms and the frame; and
two rear shock absorber and spring assemblies connected between the two rear swing arms and the frame.

15. The vehicle of claim 13, further comprising a sway bar having two ends connected to the two rear swing arms and a central portion pivoting about a sway bar axis, the sway bar axis being disposed forward of the rear swing arm axis and rearward of the intermediate wheel axes.

16. The vehicle of claim 15, wherein vertical movement of one of the rear wheels relative to the frame does not move a corresponding end of the sway bar and as such an other one of the rear wheels is unaffected by the vertical movement.

17. The vehicle of claim 13, wherein the intermediate swing arm axis, the rear swing arm axis, the intermediate wheel axes and the rear wheel axes are parallel to each other.

18. The vehicle of claim 1, further comprising:
two rear swing arms connecting the rear wheels to the frame, the rear swing arms pivoting about a rear swing arm axis;
an intermediate gear assembly operatively connecting the engine to the intermediate wheels; and
a rear gear assembly operatively connecting the intermediate gear assembly to the rear wheels;
wherein the rear swing arm axis is disposed longitudinally between the intermediate gear assembly and the rear gear assembly.

19. The vehicle of claim 1, wherein the passenger seat is removably connected to at least one of:
the driver seat;
the frame; and
a vehicle body connected to the frame.

20. The vehicle of claim 19, wherein the passenger seat further includes at least one grab handle extending from at least one side of the passenger seat.

21. The vehicle of claim 1, wherein the seat bottom of the passenger seat is disposed forward of the floor of the cargo box.

* * * * *